(12) United States Patent
Kato et al.

(10) Patent No.: US 9,090,247 B2
(45) Date of Patent: Jul. 28, 2015

(54) CONTROL APPARATUS FOR VEHICULAR DRIVE SYSTEM

(75) Inventors: Shunya Kato, Toyota (JP); Tooru Matsubara, Toyota (JP); Kenta Kumazaki, Toyota (JP); Atsushi Tabata, Okazaki (JP); Yasuhiro Hiasa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 13/985,448

(22) PCT Filed: Feb. 21, 2011

(86) PCT No.: PCT/JP2011/053725
§ 371 (c)(1),
(2), (4) Date: Aug. 14, 2013

(87) PCT Pub. No.: WO2012/114440
PCT Pub. Date: Aug. 30, 2012

(65) Prior Publication Data
US 2013/0325238 A1      Dec. 5, 2013

(51) Int. Cl.
| | |
|---|---|
| *B60W 10/10* | (2012.01) |
| *B60W 30/19* | (2012.01) |
| *B60W 10/06* | (2006.01) |
| *B60W 10/08* | (2006.01) |
| *B60W 20/00* | (2006.01) |
| *B60K 6/445* | (2007.10) |
| *B60W 30/188* | (2012.01) |

(52) U.S. Cl.
CPC ............... *B60W 10/10* (2013.01); *B60K 6/445* (2013.01); *B60W 10/06* (2013.01); *B60W 10/08* (2013.01); *B60W 20/00* (2013.01); *B60W 30/19* (2013.01);

(Continued)

(58) Field of Classification Search
CPC .. B60W 30/19; B60W 10/10; Y02T 10/6286; F16H 2061/0422; F16H 2061/0433
USPC .............................................. 701/22
See application file for complete search history.

(56) References Cited

U.S. PATENT DOCUMENTS

| 6,024,670 A * | 2/2000 | Kitagawa et al. ............. 477/109 |
| 6,884,199 B2 * | 4/2005 | Notsu et al. ....................... 477/5 |

(Continued)

FOREIGN PATENT DOCUMENTS

| CN | 1447758 A | 10/2003 |
| CN | 101260936 A | 9/2008 |

(Continued)

OTHER PUBLICATIONS

JPO machine translation of JP 2008-213717 (original JP document published Sep. 18, 2008).*

*Primary Examiner* — Behrang Badii
*Assistant Examiner* — David Testardi
(74) *Attorney, Agent, or Firm* — Oliff PLC

(57) ABSTRACT

A control apparatus for a drive system of a vehicle, provided with a transmission, and an electric motor operable to change an operating speed of the engine during the process of shifting of the transmission. The control apparatus controls a discrete change of the operating speed of said engine, with at least one of torques assigned to be respectively generated by said engine and said electric motor in a discrete shifting operation of the transmission mechanism which is performed in response to an operation of an operator of the vehicle and in which the discrete change of the operating speed of said engine takes place, includes a torque assignment determining portion configured to determine a percentage of the torque assigned to said engine in said discrete shifting operation such that the percentage increases with an increase of an amount of change of the operating speed of the engine.

5 Claims, 14 Drawing Sheets

SHIFTING TIME ENGINE SPEED CHANGE AMOUNT Ned [rpm]
(ENGINE SPEED CHANGE DIFFERENCE)

(52) U.S. Cl.
CPC .............. *B60W 20/30* (2013.01); *B60W 30/188* (2013.01); *B60W 2540/165* (2013.01); *B60W 2710/0644* (2013.01); *B60W 2710/0666* (2013.01); *B60W 2710/081* (2013.01); *B60W 2710/083* (2013.01); *Y02T 10/6239* (2013.01); *Y02T 10/6286* (2013.01); *Y10S 903/93* (2013.01)

(56) References Cited

U.S. PATENT DOCUMENTS

| | | | |
|---|---|---|---|
| 7,367,917 B2 * | 5/2008 | Sakamoto et al. | 477/5 |
| 7,771,310 B2 * | 8/2010 | Tanishima | 477/5 |
| 7,894,964 B2 * | 2/2011 | Murayama et al. | 701/54 |
| 8,032,287 B2 * | 10/2011 | Nozaki et al. | 701/54 |
| 8,061,463 B2 * | 11/2011 | Kitano et al. | 180/65.285 |
| 8,251,866 B2 * | 8/2012 | Kaltenbach | 477/5 |
| 8,315,755 B2 * | 11/2012 | Hirata et al. | 701/22 |
| 8,386,140 B2 * | 2/2013 | Tsuda et al. | 701/60 |

FOREIGN PATENT DOCUMENTS

| | | | |
|---|---|---|---|
| JP | 2006205900 A | * | 8/2006 |
| JP | 2008213717 A | * | 9/2008 |
| JP | A-2008-213717 | | 9/2008 |
| JP | A-2009-132258 | | 6/2009 |
| JP | A-2010-13002 | | 1/2010 |
| JP | A-2010-143383 | | 7/2010 |

* cited by examiner

SHIFTING TIME ENGINE SPEED CHANGE AMOUNT Ned [rpm]
(ENGINE SPEED CHANGE DIFFERENCE)

PERMISSIBLE BATTERY DISCHARGING ENERGY AMOUNT LIMIT Wout [kW]
(OR PERMISSIBLE BATTERY CHARGING ENERGY AMOUNT LIMIT Win)

CONTROL APPARATUS FOR VEHICULAR DRIVE SYSTEM

TECHNICAL FIELD

The present invention relates to techniques for improving drivability of a vehicle provided with an engine and an electric motor.

BACKGROUND ART

There is known a control apparatus for a vehicular drive system provided with a transmission mechanism constituting a part of a power transmitting path between an engine and drive wheels, and an electric motor operable to change an operating speed of the engine in the process of shifting of the transmission mechanism. Patent Document 1 discloses an example of such a control apparatus in the form of a drive control apparatus for a hybrid vehicle. The above-indicated transmission mechanism provided in the vehicular drive system disclosed in this Patent Document 1 is an automatic step-variable transmission which includes a plurality of planetary gear sets and a plurality of frictional coupling elements and which performs shifting actions by engaging and releasing actions of the frictional coupling elements. The above-indicated drive control apparatus disclosed in the Patent Document 1 is configured to operate the above-indicated electric motor so as to raise operating speed of the engine during a manual shift-down action of the automatic transmission performed in response to a manual operation of an operator of the vehicle, so that the shift-down action of the automatic transmission can be expedited.

PRIOR ART DOCUMENTS

Patent Documents

Patent Document 1: JP-2009-132258A
Patent Document 2: JP-2010-013002A
Patent Document 3: JP-2010-143383A

SUMMARY OF THE INVENTION

Object Achieved by the Invention

In a hybrid vehicle configured to permit the electric motor to change the operating speed of the engine as disclosed in the above-identified Patent Document 1, the engine speed can be intricately controlled with the above-indicated electric motor when a sequential shifting operation of the automatic transmission is performed so as to cause a discrete change of the engine speed in response to an operation of the vehicle operator. Actually, however, the maximum torque of the electric motor provided on the vehicle is considerably smaller than that of the engine, so that a change of the engine speed with the above-indicated electric motor requires a long length of time from a moment of initiation of the above-indicated sequential shifting operation to a moment of termination of the sequential shifting operation, where the amount of change of the engine speed to be achieved during the sequential shifting operation is large. Accordingly, the drivability of the vehicle may be deteriorated. This problem is not publicly known at the time the present invention was made.

The present invention was made in view of the background art described above. It is an object of this invention to provide a control apparatus for a drive system of a vehicle provided with a transmission mechanism constituting a part of a power transmitting path between an engine and drive wheels, and an electric motor operable to change an operating speed of the engine, which control apparatus permits an improvement of drivability of the vehicle during the above-described sequential shifting operation.

Means for Achieving the Object

According to a first aspect of the present invention, there is provided a control apparatus for (a) a drive system of a vehicle provided with a transmission mechanism constituting a part of a power transmitting path between an engine and drive wheels, and an electric motor operable to change an operating speed of the engine in the process of shifting of the transmission mechanism, the control apparatus controlling a discrete change of an operating speed of the above-described engine, with at least one of torques assigned to be respectively generated by the above-described engine and the above-described electric motor in a discrete shifting operation of the transmission mechanism which is performed in response to an operation of an operator of the vehicle and in which the discrete change of the operating speed of the above-described engine takes place, (b) characterized in that a percentage of the torque assigned to the above-described engine in the above-described discrete shifting operation is determined such that the percentage increases with an increase of an amount of change of the operating speed of the engine.

Advantages of the Invention

According to the first aspect of the present invention described above, the engine speed can be changed with a progress of the above-described discrete shifting operation of the above-described transmission mechanism, by positively utilizing the torque of the engine which increases with an increase of the amount of change of the operating speed of the above-described engine, whereby it is possible to minimize an increase of a sequential shifting time period between moments of initiation and termination of a sequential shifting operation in the form of the above-indicated discrete shifting operation, which increase would take place due to a large amount of change of the operating speed of the engine, assuring a sufficiently high degree of response of the vehicle to the operation by the vehicle operator, so that the drivability of the vehicle in the above-described sequential shifting operation (discrete shifting operation) can be improved. The word "drivability" is interpreted to mean degrees of the operating response and smoothness of the vehicle in accordance with the intention of the vehicle operator, as felt by the vehicle operator. An improvement of the drivability of the vehicle means high degrees of the operating response and smoothness of the vehicle as felt by the vehicle operator, while deterioration of the drivability means low degrees of the operating response and smoothness of the vehicle as felt by the vehicle operator.

According to a second aspect of the present invention, the control apparatus according to the first aspect of the invention is characterized in that (a) the above-described vehicle is provided with an electric-energy storage device configured to supply and receive an electric energy to and from the above-described electric motor, and (b) the percentage of the torque assigned to the above-described engine in the above-described discrete shifting operation is determined such that the percentage increases with an increase of an amount of limitation of charging or discharging of the electric energy of the above-described electric-energy storage device. According to this second aspect, the engine speed can be changed with the torque of the engine (hereinafter referred to as "engine torque") at a sufficiently high rate, even when there is a risk that the torque of the electric motor (hereinafter referred to as "motor torque") is insufficient to change the engine speed at a high rate in the above-described sequential shifting operation, due to limitation of charging or discharging of the electric energy of the electric-energy storage device. Therefore, it is possible to minimize an increase of the above-indicated sequential shifting time period.

According to a third aspect of the invention, the control apparatus according to the first or second aspect of the invention is characterized in that the percentage of the torque assigned to the above-described engine in the above-described discrete shifting operation is determined such that the percentage increases with a decrease of a temperature of the above-described engine. According to this third aspect, the engine speed can be changed with the engine torque at a sufficiently high rate, even when there is a difficulty of change of the engine speed at a high rate in the above-described sequential shifting operation due to a large rotary resistance (friction) of the engine at a low temperature of the engine. Therefore, it is possible to minimize an increase of the above-indicated sequential shifting time period. When the temperature of the engine is low with an insufficient warm-up operation thereof, for example, the rotary resistance of the engine is relatively large. According to the third aspect of the invention, therefore, the percentage of the torque assigned to the above-described engine is higher before the warm-up operation than after the warm-up operation, for instance.

According to a fourth aspect of the invention, the control apparatus according to one of the first through third aspects of the invention is characterized in that when a determination is made that the torque of the above-described engine or the above-described electric motor during a change of the operating speed of the above-described engine in the above-described discrete shifting operation is insufficient and that the above-described discrete shifting operation will not be terminated within a predetermined target shifting time period, the percentage of one of the torques of the above-described engine and the above-described electric motor an amount of insufficiency of which is larger than the other is reduced with respect to a value before a moment of the determination during changing the operating speed of the engine. According to this fourth aspect, the above-described sequential shifting operation (discrete shifting operation) can be terminated within the above-described target shifting time period with a higher degree of stability, than where the determination as to whether the above-described sequential shifting operation will be terminated within the target shifting time period is not made. In this respect, the drivability of the vehicle can be improved. The insufficiency of the torque of the above-described engine or electric motor is insufficiency of the torque in the direction of change of the operating speed of the above-described engine in the above-described sequential shifting operation, in other words, in the positive direction parallel to the direction of change of the operating speed of the above-described engine in the sequential shifting operation.

According to a fifth aspect of the invention, there is provided a control apparatus for (a) a drive system of a vehicle provided with a transmission mechanism constituting a part of a power transmitting path between an engine and drive wheels, and an electric motor operable to change an operating speed of the engine in the process of shifting of the transmission mechanism, the control apparatus controlling a discrete rise of the operating speed of the above-described engine, with at least one of torques assigned to be respectively generated by the above-described engine and the above-described electric motor in a discrete shift-down operation of the transmission mechanism which is performed in response to an operation of an operator of the vehicle and in which the discrete rise of the operating speed of the above-described engine takes place, (b) characterized in that an amount of increase of a speed ratio of the above-described transmission mechanism caused by the above-described discrete shift-down operation and a percentage of the torque assigned to the above-described engine in the above-described discrete shift-down operation are made larger for larger value of the speed ratio with an increase of the above-described speed ratio prior to the above-described shift-down operation. The present fifth aspect of the invention makes it possible to minimize an increase of the above-described sequential shifting time period due to a large value of the amount of change of the engine speed, which amount of change increases with an increase of the amount of increase of the above-indicated speed ratio caused by the above-described shift-down operation. Accordingly, the fifth aspect assures a high degree of response of the vehicle to the operation of the vehicle operator, and makes it possible to improve the drivability of the vehicle in the above-described sequential shifting operation.

In a preferred form of the invention, the percentage of the torque assigned to the above-described engine in the above-described sequential shifting operation is determined according to predetermined relationships and on the basis of running condition of the vehicle. For instance, the running condition includes at least one of an amount of change of the engine speed, a permissible amount (an upper limit) of charging of an electric energy of the above-described electric-energy storage device, a permissible amount (an upper limit) of discharging of the electric energy of the electric-energy storage device, and the temperature of the above-described engine, in the above-described sequential shifting operation. In this form of the invention, the above-described percentage of the torque assigned to the above-described engine can be easily and adequately determined prior to the moment of initiation of the sequential shifting operation. A decrease of the above-indicated permissible amount of charging of the electric energy means an increase of an amount of limitation of charging of the electric energy, while a decrease of the above-indicated permissible amount of discharging of the electric energy means an increase of an amount of limitation of discharging of the electric energy.

In another preferred form the invention, the above-indicated sequential shifting operation (discrete shifting operation) is either a sequential shift-down action (discrete shift-down action) which causes a rise of the operating speed of the above-described engine with respect to a value before the moment of initiation of the shifting operation and which takes place during a coasting run of the above-described vehicle, or a sequential shift-up action (discrete shift-up action) which causes a drop of the operating speed of the above-described engine with respect to the value before the moment of initiation of the shifting operation and which takes place during an accelerating run of the above-described vehicle. This form of the invention makes it possible to improve the operating response of the vehicle, during the sequential shifting operation in which the vehicle operator particularly desires a high degree of the operating response of the vehicle, whereby the drivability of the vehicle in the sequential shifting operation can be effectively improved.

In the above-described fifth aspect of the invention, the above-described discrete shifting operation described with respect to the first aspect of the invention is limited to the above-described discrete shift-down operation. The amount of change of the operating speed of the above-described engine increases with an increase of an amount of increase of the above-indicated speed ratio caused by the discrete shift-down operation. Therefore, the first and fifth aspects of the invention have the same particular technical characteristic that the percentage of the torque assigned to the above-described engine increases with an increase of the amount of change of the operating speed of the engine, in the above-described discrete shifting operation. Thus, the first and fifth aspects of the invention relate to each other so as to form a single general inventive concept.

MODE FOR CARRYING OUT THE INVENTION

Figure 1:
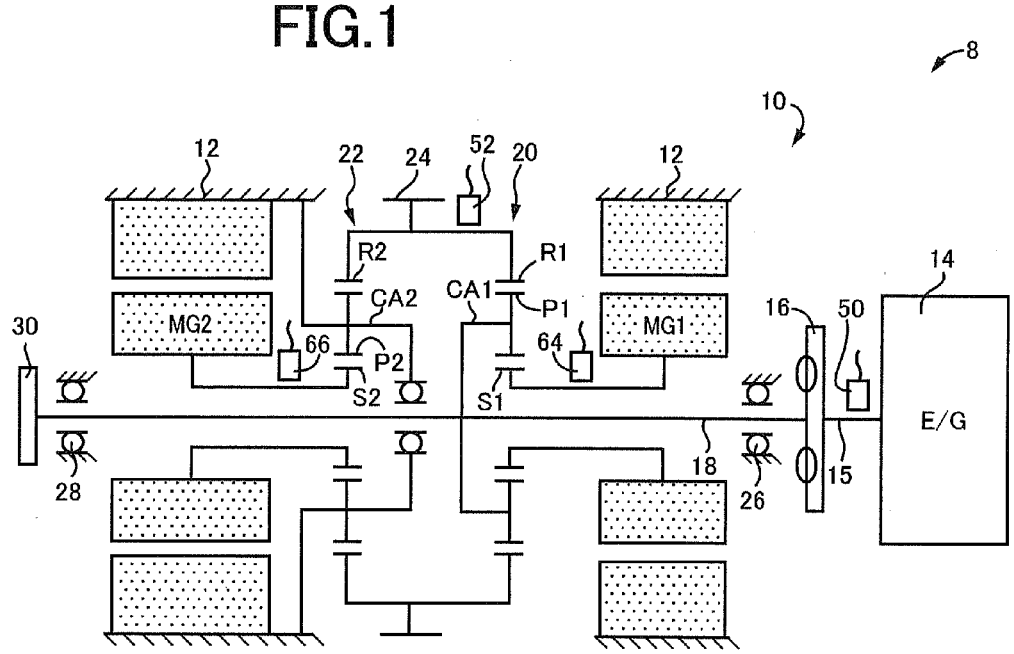
FIG. 1 is a schematic view for explaining a vehicular drive system constructed according to a first embodiment of the present invention.

Referring to the drawings, embodiments of this invention will be described in detail.

First Embodiment

FIG. 1 is the schematic view for explaining a vehicular drive system 8 to which the present invention is applicable. As shown in FIG. 1, the vehicular drive system 8 is provided with an engine 14 for generating a vehicle drive force, and a vehicular power transmitting device 10 (hereinafter referred to as "power transmitting device 10") interposed between the engine 14 and drive wheels 40 (shown in FIG. 4). The power transmitting device 10 is a transaxle for transmitting the drive force from the engine 10 to the drive wheels 40. Within a transaxle (T/A) casing 12 (hereinafter referred to as "casing 12") which is a stationary member fixed to a vehicle body, the power transmitting device 10 is provided with the following elements disposed in the order of description from the side of the engine 14: a damper 16 operatively connected to an output shaft 15 (crankshaft, for instance) of the engine 14 and configured to absorb a pulsating variation of torque received from the engine 14; an input shaft 18 rotated by the engine 14 through the damper 16; a first electric motor MG1 (an electric motor provided according to the present invention); a first planetary gear set 20 which is a differential mechanism a differential state of which is continuously variable; a second planetary gear set 22 functioning as a speed reducing device;

and a second electric motor MG2 operatively connected to the drive wheels 40 and provided to generate a vehicle chive force.

Figure 4:
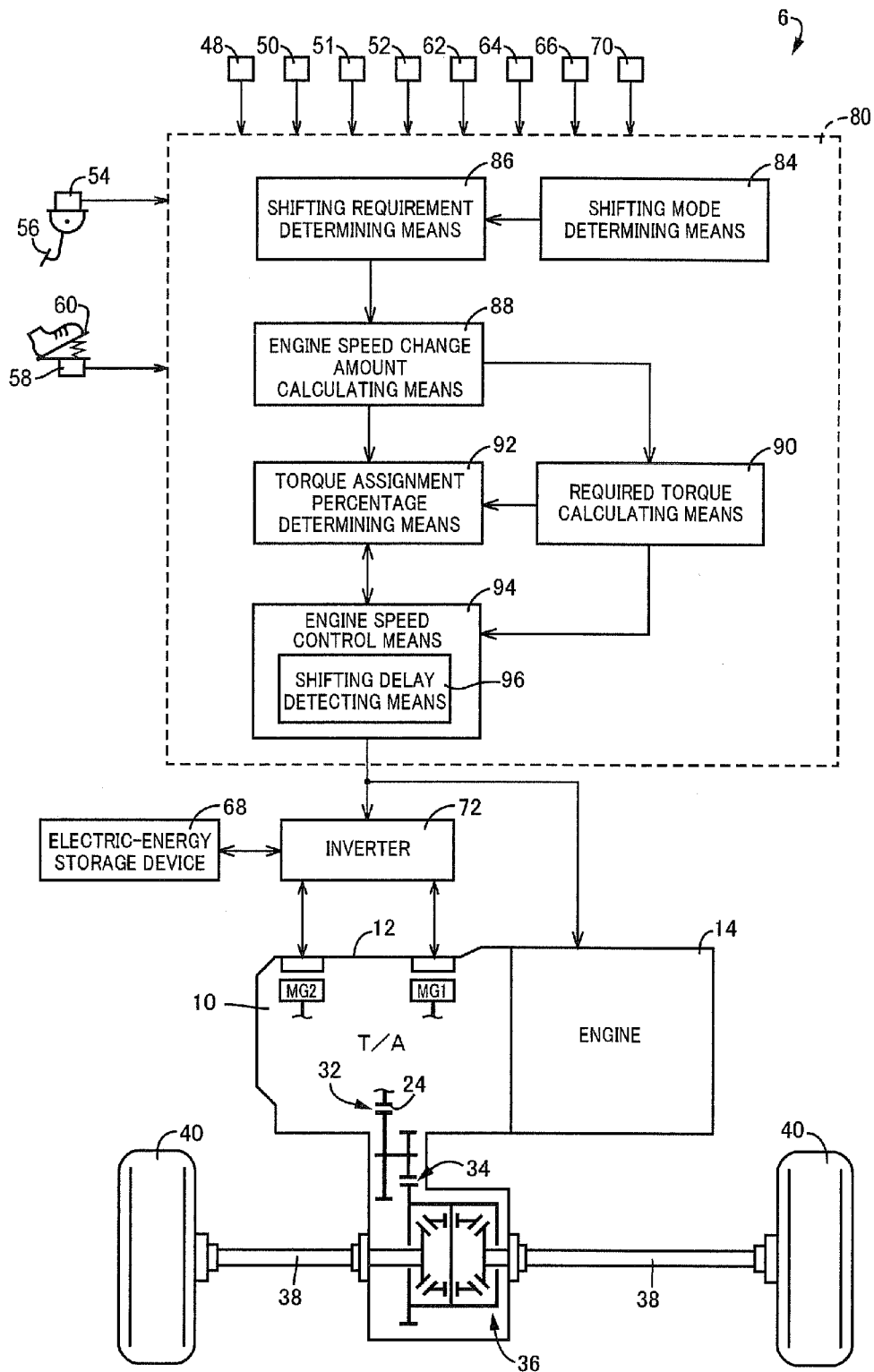
FIG. 4 is a functional block diagram illustrating input signals received by and output signals generated from the electronic control device for controlling the vehicular drive system of FIG. 1 according to the first embodiment, and explaining major control functions of the electronic control device.

This power transmitting device 10 is installed transversely in a front portion of a vehicle 6, which is of an FF (front-engine front-drive) type, for example, and is suitably usable to drive the drive wheels 40. The power transmitting device 10 has an output rotary member in the form of an output gear 24 which is one of gears of a counter gear pair 32. The drive force of the engine 14 is transmitted from the output gear 24 to the pair of drive wheels 40 through the counter gear pair 32, a final gear pair 34, a differential gear device (final speed reducing device) 36 and a pair of axles 38, in the order of description (as shown in FIG. 4). In the present embodiment wherein the input shaft 18 and the engine 14 are operatively connected to each other through the damper 16, the output shaft 15 of the engine 14 functions as an output rotary member of the engine 14, and the input shaft 18 is also considered to function as the output member of the engine 14.

While the engine 14 may be any type of internal combustion engine such as a gasoline engine or a diesel engine for automobiles, the engine 14 is an automobile gasoline engine in the present embodiment. A torque Te generated by this engine 14 is adjusted by one or a combination of: an opening and closing control of an electronic throttle valve of the engine 14; an ignition timing control of the engine 14; and an opening and closing timing control of an intake and an exhaust valve of the engine 14.

The input shaft 18 is rotatably supported at its opposite ends by ball bearings 26 and 28, and is connected at one of the opposite ends to the engine 14 through the damper 16 so that the input shaft 18 is rotated by the engine 14. The input shaft 18 is connected at the other end to a lubricant supply device in the form of an oil pump 30, so that the oil pump 30 is operated by the input shaft 18, to supply a lubricating oil to various portions of the power transmitting device 10 such as the first planetary gear set 20, second planetary gear set 22, an ball bearings 26, 28.

The first planetary gear set 20 is a transmission mechanism constituting a part of a power transmitting path between the engine 14 and the drive wheels 40. The first planetary gear set 20 functions as a power distributing mechanism operable to distribute the drive force of the engine 14 to an electric power transmitting path and a mechanical power transmitting path. Described more specifically, the first planetary gear set 20 is a single-pinion type planetary gear set provided with rotary elements (elements) consisting of: a first sun gear S1; a first pinion gear P1; a first carrier CA1 supporting the first pinion gear P1 such that the first pinion gear P1 is rotatable about its axis and an axis of the planetary gear set 20; and a first ring gear R1 meshing with the first sun gear S1 through the first pinion gear P1. The first planetary gear set 20 has a gear ratio $\rho 0$ calculated according to an equation $\rho 0 = Z_{S1}/Z_{R1}$, where $Z_{S1}$ represents the number of teeth of the first sun gear S1, while $Z_{R1}$ represents the number of teeth of the first ring gear R1.

The first planetary gear set 20 is the power distributing mechanism configured to mechanically distribute the output of the engine 14 received by the input shaft 18, to the first electric motor MG1 and the output gear 24. Namely, this first planetary gear set 20 is configured such that a first rotary element in the form of the first carrier CA1 is connected to the input shaft 18, that is, to the engine 14, and a second rotary element in the form of the first sun gear S1 is connected to the first electric motor MG1, while a third rotary element in the form of the first ring gear R1 is connected to the output gear 24, that is, to the drive wheels 40 operatively connected to the output gear 24. Thus, the first sun gear S1, first carrier CA1 and first ring gear R1 are rotatable relative to each other, so that the output of the engine 14 is distributed to the first electric motor MG1 and the output gear 24. The first electric motor MG1 is operated with a portion of the output of the engine 14 distributed thereto, to generate an electric energy which is stored in an electric-energy storage device or used to operate the second electric motor MG2. Accordingly, the power transmitting device 10 can be placed in a continuously variable shifting state (electric CVT state) in which the differential state of the first planetary gear set 20 is controlled by the first electric motor MG1 to continuously change the rotating speed of the output gear 24, irrespective of operating speed of the engine 14, so that the first planetary gear set 20 functions as an electrically controlled continuously variable transmission. When the first electric motor MG1 is placed in a non-load free state in which power transmission between the first carrier CA1 and the first ring gear R1 is inhibited, the first planetary gear set 20 also functions as a power cut-off device operable to inhibit power transmission between the engine 14 and the drive wheels 40.

The second planetary gear set 22 is a single-pinion type planetary gear set, which is provided with rotary elements consisting of: a second sun gear S2; a second pinion gear P2; a second carrier CA2 supporting the second pinion gear P2 such that the second pinion gear P2 is rotatable about its axis and an axis of the planetary gear set 22; and a second ring gear R2 meshing with the second sun gear S2 through the second pinion gear P2. It is noted that the ring gear R1 of the first planetary gear set 20 and the ring gear R2 of the second planetary gear set 22 are formed integrally with each other, as a composite gear a radially outer portion of which serves as the output gear 24. In the present embodiment, therefore, the rotating speed of the ring gear R1 and the rotating speed of the ring gear R2, and the rotating speed of the output gear 24 are equal to each other.

In the second planetary gear set 22, the second carrier CA2 is fixed to the stationary member in the form of the casing 12, so that a rotary motion of the second carrier CA2 is prevented, while the second sun gear S2 is connected to the second electric motor MG2, while the second ring gear R2 is connected to the output gear 24. Namely, the second electric motor MG2 is connected to the output gear 24 and the ring gear R1 of the first planetary gear 20 through the second planetary gear set 22, so that the second sun gear S2 is rotated with an operation of the second electric motor MG2 upon starting of the vehicle, for instance, and a rotary motion of the second sun gear S2 is decelerated by the second planetary gear set 22, before the rotary motion is transmitted to the output gear 24.

Each of the first electric motor MG1 and the second electric motor MG2 of the present embodiment is a so-called motor/generator also having a function of an electric generator. The first electric motor MG1 and second electric motor MG2 are electrically connected to an electric-energy storage device 68 through an inverter 72 (shown in FIG. 4), and the first and second electric generators MG1, MG2 and the electric-energy storage device 68 are configured to supply and receive an electric energy to and from each other. The first electric motor MG1 functioning as a differential electric motor has at least the function of the electric generator for generating a reaction force, while the second electric motor MG2 functioning as a vehicle driving electric motor has at least the function of the electric motor for generating a drive force to drive the vehicle 6. The above-indicated electric-energy storage device 68 is a battery (secondary battery) or a capacitor such as a lead acid battery, and is an electric energy source which can supply and receive an electric energy to and from the first electric motor MG1 and second electric motor MG2.

The vehicular drive system 8 constructed as described above is provided with a control apparatus for controlling the vehicular drive system 8 in the form of an electronic control device 80 (shown in FIG. 4). When the electronic control device 80 is turned on with an operation of a power switch after a key is inserted into a slot while a brake pedal 56 is placed in an operated position, the electronic control device 80 calculates a vehicle output required by an operator of the vehicle, on the basis of an operation amount Acc of an accelerator pedal 60 (shown in FIG. 4), which corresponds to the vehicle operator's required vehicle output. The electronic control device 80 commands the engine 14 and/or the second electric motor MG2 to generate the required vehicle output, with a high degree of fuel economy and with a minimum amount of exhaust emissions. For instance, the electronic control device 80 selects one of a motor drive mode, a charging drive mode, an engine drive mode, etc., depending on the vehicle running condition. In the motor drive mode, only the second electric motor MG2 is used as a drive power source while the engine 14 is held at rest. In the charging drive mode, the second electric motor MG2 is used as the drive power source while the engine 14 is operated to operate the first electric motor MG1 as the electric generator. In the engine drive mode, the drive force of the engine 14 is mechanically transmitted to the drive wheels 40. The second electric motor MG2 may be operated as needed, together with the engine 14, to generate an assisting drive force.

In the above-indicated engine drive mode, the electronic control device 80 controls the first electric motor MG1 to control operating speed Ne of the engine 14 (hereinafter referred to as "engine speed Ne") such that the engine 14 operates following a predetermined curve of operation such as a lowest fuel economy curve. When the electronic control device 80 controls the engine speed Ne and an amount of generation of an electric energy by the first electric motor MG1, the electronic control device 80 continuously controls a speed ratio $\gamma 0$ of the first planetary gear set 20 ($\gamma 0$=rotating speed of the input shaft 18/rotating speed of the output gear 24), within a predetermined range in which shifting is permitted. That is, the electronic control device 80 controls the first electric motor MG1 to continuously control the differential state of the first planetary gear set 20. During a coasting run of the vehicle 6, the electronic control device 80 controls the second electric motor MG2 so as to be operated with an inertial energy of the coasting vehicle 6, to perform a regenerative operation so that a generated electric energy is stored in the electric-energy storage device 68. In a sporty drive mode described below, the speed ratio $\gamma 0$ of the first planetary gear set 20 is purposely changed in a discrete manner, namely, in steps.

The vehicle is driven in the reverse direction with the second electric motor MG2 operated in the reverse direction. At this time, the electronic control device 80 places the first electric motor MG1 in a free state, to permit the output gear 24 to be rotated in the reverse direction irrespective of the operating state of the engine 14.

In the above-indicated motor drive mode, the electronic control device 80 operates the second electric motor MG2 with an electric energy supplied from the electric-energy storage device 68 while the engine 14 is held at rest i.e. only the second electric motor MG2 performs as a power source of the vehicle 6. In this motor drive mode, the first electric motor MG1 is placed in a non-load free state to maintain the engine speed Ne at zero or substantially zero, with the differential function of the first planetary gear set 20, for the purpose of preventing a dragging action of the engine 14 held at rest, to improve the fuel economy. Namely, not only the operation of the engine 14 but also the dragging action of the engine 14 are inhibited in the motor drive mode.

Figure 2:
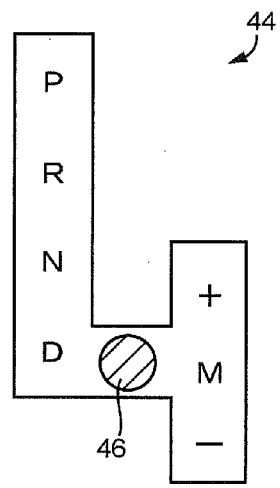
FIG. 2 is a view showing an example of a manual shifting device provided as a switching device manually operable to select one of a plurality of shift positions in the vehicular chive system of FIG. 1.

FIG. 2 is the view showing an example of a manual shifting device 44 provided as a switching device manually operable to select one of a plurality of shift positions $P_{SH}$. This manual shifting device 44 is disposed on one side of an operator's seat, for example, and is provided with a shift lever 46 operable to select one of the plurality of shift positions $P_{SH}$.

The shift lever 46 is manually operable to: a parking position "P" in which the power transmitting device 10, that is, the first planetary gear set 20 is placed in a neutral state for cutting off its power transmitting path, and in which the output gear 24 is held in a locked state; a reverse-drive position "R" for reverse driving of the vehicle; a neutral position "N" in which the first planetary gear set 20 is placed in the neutral state; an automatic forward-drive position "D" in which an automatic shifting control is implemented to continuously change the speed ratio $\gamma 0$ of the first planetary gear set 20 within the predetermined range in which change of the speed ratio is permitted; a manual forward-drive position "M" for establishing a sequential shifting mode so-called "a sporty drive mode" in which a sequential shifting operation (sequential shifting control) of the first planetary gear set 20 is performed, during a forward driving of the vehicle, to implement a virtual or imaginary step-variable shifting control to change the speed ratio $\gamma 0$ of the first planetary gear set 20 in steps, namely, in a discrete manner, within the predetermined range. In the parking and neutral positions "P" and "N", for example, the power transmitting device 10 is placed in its neutral state, with the first and second electric motors MG1, MG2 being placed in the non-load free state.

The shift lever 46 is operable from the manual forward-drive position "M" to a "+" position and a "−" position. When an operating force is released from the shift lever 46, the shift lever 46 is returned with a biasing force of a spring, for instance, to the manual forward-drive position M which is intermediate between the "+" and "−" positions. In the above-indicated sequential shifting mode (sporty drive mode) established in the manual forward-drive position "M", the speed ratio $\gamma 0$ of the first planetary gear set 20 is reduced in steps each time the shift lever 46 is operated to the "+" position, and increased in steps each time the shift lever 46 is operated to the "−" position in a range where the speed ratio $\gamma 0$ is permitted. Namely, the first planetary gear set 20 is shifted up by one speed position upon each operation of the shift lever 46 to the "+" position, and is shifted down by one speed position upon each operation of the shift lever 46 to the "−" position. In the present embodiment, the first planetary gear set 20 has a first speed position ($1^{st}$), a second speed position ($2^{nd}$), a third speed position ($3^{rd}$) and a fourth speed position ($4^{th}$) having respective different values of the speed ratio $\gamma 0$ of the first planetary gear set 20, as a plurality of speed positions selectable by the above-described sequential shifting operation. The speed ratio $\gamma 0$ of the first planetary gear set 20 is increased in steps, for instance, in a geometrical manner, as the first planetary gear set 20 is shifted down by one speed position by the above-described sequential shifting operation. In the above-described sequential shifting mode, the above-indicated first speed position is the lowest speed position, while the above-indicated fourth speed position is the highest speed position. In the sequential shifting mode, a difference between the speed ratios $\gamma 0$ of the above-indicated first and second speed positions, that is, a speed ratio difference of these first and second speed positions is larger than a difference between the speed ratios $\gamma 0$ of the above-indicated second and third speed positions, and a difference between the speed ratios γ0 of the above-indicated second and third speed positions is larger than a difference between the speed ratios γ0 of the above-indicated third and fourth speed positions. Namely, an amount of change of the speed ratio γ0 caused by the sequential shifting operation is relatively large when the two speed positions established before and after the sequential shifting operation are relatively low-speed positions than when those two speed positions are relatively high-speed positions.

Figure 3:
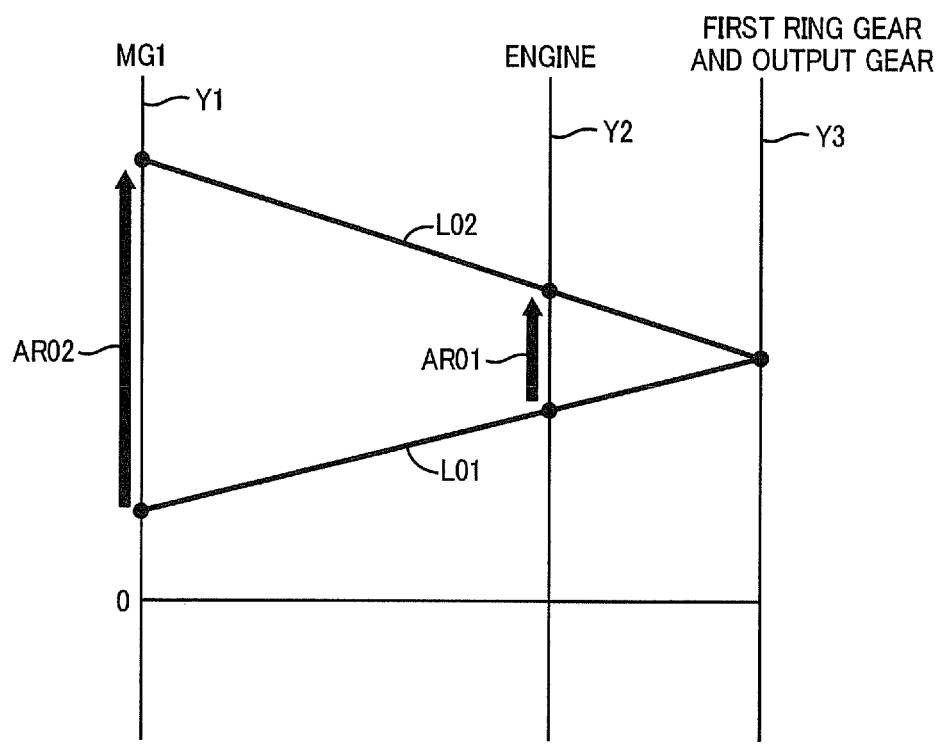
FIG. 3 is a collinear chart for explaining a sequential shift-down operation of a first planetary gear set performed under a control of an electronic control device of the vehicular drive system of FIG. 1 according to the first embodiment.

FIG. 3 is the collinear chart for explaining a shift-down action of the first planetary gear set 20 performed in the above-described sequential shifting operation. Vertical lines Y1, Y2 and Y3 indicated in FIG. 3 respectively represent relative rotating speeds of the first electric motor MG1, engine 14 and output gear 24. Distances between the vertical lines Y1, Y2 and Y3 are determined according to a gear ratio ρ0 of the first planetary gear set 20. In FIG. 3, the rotating speeds increase in the upward direction along the vertical lines Y1, Y2 and Y3. A solid line L01 represents the relative rotating speeds of the first electric motor MG1, engine 14 and output gear 24 before the above-indicated shift-down action is performed, while a solid line L02 represents the relative rotating speeds of the first electric motor MG1, engine 14 and output gear 24 after the shift-down action is performed. During running of the vehicle, a rotating speed $N_{OUT}$ of the output gear 24 which is determined by the rotating speed of the drive wheels 40 does not vary unless a running speed V of the vehicle varies, so that the rotating speed $N_{OUT}$ does not vary as a result of the above-indicated shift-down action, as is apparent from FIG. 3. The above-indicated shift-down action causes a rise of the operating speed Ne of the engine, as indicated by an arrow AR01, and a concurrent rise of an operating speed $N_{MG1}$ of the first electric motor rises, as indicated by an arrow AR02.

A shift-up action of the first planetary gear set 20 by the above-indicated sequential shifting operation causes changes of the operating speeds of the first electric motor MG1 and engine 14 in the direction opposite to that of the arrows AR01 and AR02 in FIG. 3, that is, in the direction opposite to the direction of change caused by the above-described shift-down action. Namely, the shift-up action causes a drop of the engine speed Ne, and a concurrent drop of the operating speed $N_{MG1}$ of the first electric motor. Thus, the operating speed $N_{MG1}$ of the first electric motor varies with the engine speed Ne as a result of either of the shift-up and shift-down actions of the first planetary gear set 20, so that the first electric motor MG1 can be positively used to change the engine speed Ne in the process of a shifting action of the transmission mechanism in the form of the first planetary gear set 20.

FIG. 4 is the functional block diagram illustrating input signals received by and output signals generated from the electronic control device 80, and explaining major control functions of the electronic control device 80. This electronic control device 80 includes a so-called microcomputer which incorporates a CPU, a ROM, a RAM and an input/output interface and which performs signal processing operations according to programs stored in the ROM, while utilizing a temporary data storage function of the RAM, to implement vehicle controls such as hybrid drive controls relating to the engine 14, the first electric motor MG1 and the second electric motor MG2.

As shown in FIG. 4 the electronic control device 80 is configured to receive signals such as: an output signal of an engine speed sensor 50 indicative of the engine speed Ne; an output signal of an engine water temperature sensor 51 provided in a cylinder block of the engine 14, which is indicative of an engine water temperature $TEMP_W$; an output signal of a vehicle speed sensor 52 indicative of the vehicle running speed V corresponding to the rotating speed $N_{OUT}$ of the output gear 24 (hereinafter referred to as "output speed $N_{OUT}$"); an output signal of a foot brake switch 54 indicative of an operated or non-operated state of the brake pedal 56; an output signal of an accelerator pedal operation amount sensor 58 indicative of the operation amount Acc of the accelerator pedal 60; an output signal of a throttle valve opening angle sensor 62 indicative of an opening angle $\theta_{TH}$ of an electronic throttle valve provided to adjust an intake air quantity of the engine 14; an output signal of a first electric motor speed sensor 64 in the form of an MG1 resolver indicative of the operating speed $N_{MG1}$ of the first electric motor MG1 (hereinafter referred to as "first electric motor speed $N_{MG1}$"); an output signal of a second electric motor speed sensor 66 in the form of an MG2 resolver indicative of an operating speed $N_{MG2}$ of the second electric motor MG2 (hereinafter referred to as "second electric motor speed $N_{MG2}$"); an output signal indicative of a charging or discharging current $I_{CD}$ of the electric-energy storage device 68; an output signal indicative of a stored electric energy amount (charging state) SOC of the electric-energy storage device 68; and an output signal of a shift lever position sensor 70 indicative of the presently selected one of the operating positions (shift positions) $P_{SH}$ of the shift lever 46.

The electronic control device 80 is further configured to generate signals such as: engine output control signals for controlling engine output including a drive signal to be applied to a throttle actuator provided to adjust the opening angle $\theta_{TH}$ of the above-indicated electronic throttle valve disposed in an intake pipe of the engine 14, a fuel supply control signal for controlling an amount of supply of a fuel from a fuel injecting device into the intake pipe or the cylinders of the engine 14, and an ignition timing control signal for controlling the timing of ignition of the engine 14 by an igniting device; and command signals to be applied to the electric motors MG1 and MG2. During a normal running of the vehicle, a throttle control of the engine 14 is implemented to operate the above-indicated throttle actuator on the basis of the accelerator pedal operation amount Acc, such that the throttle valve opening angle $\theta_{TH}$ increases with an increase of the accelerator pedal operation amount Acc. This throttle control is implemented such that the throttle valve opening angle $\theta_{TH}$ changes in proportion with the accelerator pedal operation amount Acc.

By the way, the first planetary gear set 20 is shifted in a virtual or imaginary manner according to an operation of the shift lever 46 by the vehicle operator to perform the above-indicated sequential shifting operation, namely, the discrete shifting operation in the above-indicated sequential shifting mode. To assure a high degree of a response of the shifting operation according to the intention of the vehicle operator, the speed ratio γ0 of the first planetary gear set 20 should be rapidly changed according to the vehicle operator's operation. Since the rotating speed of the first ring gear R1 is determined by the vehicle running speed V during running of the vehicle, a change of he speed ratio γ0 of the first planetary gear set 20 takes place with a corresponding change of the engine speed Ne. An amount of change of the engine speed Ne increases with an increase of an amount of change of the speed ratio γ0 caused by the sequential shifting operation. The vehicular drive system 8 shown in FIG. 1 is configured such that the engine speed Ne can be changed by one or both of the torques generated by the engine 14 per se and the first electric motor MG1. For intricately controlling the engine speed Ne, it is more advantageous to control the engine speed Ne by controlling the torque $T_{MG1}$ generated by the first electric motor MG1 (hereinafter referred to as "first electric motor torque $T_{MG1}$"). For changing the engine speed Ne by a large amount at a high rate, it is more advantageous to control the engine speed Ne by controlling the torque Te generated by the engine 14 (hereinafter referred to as "engine torque Te"). The electronic control device 80 has control functions which permit the above-indicated sequential shifting operation to be rapidly performed according to the intention of the vehicle operator, in view of the above-described operating characteristics of the engine 14 and the first electric motor MG1. Major portions of these control functions will be described.

As shown in FIG. 4, the electronic control device 80 is provided with a shifting mode determining portion in the form of shifting mode determining means 84, a shifting requirement determining portion in the form of shifting requirement determining means 86, an engine speed change amount calculating portion in the form of engine speed change amount calculating means 88, a required torque calculating portion in the form of required torque calculating means 90, a torque assignment percentage determining portion in the form of torque assignment percentage determining means 92, and an engine speed control portion in the form of engine speed control means 94. The engine speed control means 94 is provided with a shifting delay detecting portion in the form of shifting delay detecting means 96.

The shifting mode determining means 84 is configured to receive from time to time the output signal of the shift lever position sensor 70 indicative of the presently selected shift position $P_{SH}$ of the shift lever 46, and to determine whether the first planetary gear set 20 i.e. the shifting mode of the vehicle 6, is placed in the above-indicated sequential shifting mode (sporty drive mode). Described more specifically, the shifting mode determining means 84 determines that the first planetary gear set 20 is placed in the above-indicated sequential shifting mode, if the shift lever 46 is placed in the manual forward-drive position "M". In the above-described sequential shifting operation of the first planetary gear set 20 in the above-indicated sequential shifting mode, the virtual or imaginary step-variable shifting control is implemented to change the speed ratio γ0 of the first planetary gear set 20 in steps during forward driving of the vehicle, as described above, such that the engine speed Ne changes with a change of the speed ratio γ0. Thus, this step-variable shifting of the first planetary gear set 20 also causes a discrete change, namely, step-variable change of the engine speed Ne according to the vehicle operator's operation of the shift lever 46, for example.

The shifting requirement determining means 86 is configured to determine whether the vehicle operator has required a shifting operation of the vehicle 6, that is, a shifting operation of the first planetary gear set 20 in the above-indicated sequential shifting mode. The determination as to whether the vehicle 6 is placed in the above-indicated sequential shifting mode or not is made by the shifting mode determining means 84. For instance, the shifting requirement determining means 86 receives from time to time the output signal of the shift lever position sensor 70 indicative of the presently selected shift position $P_{SH}$ of the shift lever 46, and determines that the vehicle operator has required the shifting operation, if the shift lever 46 has been operated to the "+" or "−" position. Where the above-indicated sequential shifting operation is performed when an amount of increase of the accelerator pedal operation amount Acc has exceeded a predetermined upper limit, the shifting requirement determining means 86 may determine that the vehicle operator has required the down shifting operation, if the amount of increase of the operation amount Acc has exceeded the upper limit.

The engine speed change amount calculating means 88 is operated when the shifting requirement determining means 86 has determined that the vehicle operator has required the shifting operation in the above-indicated sequential shifting mode. The engine speed change amount calculating means 88 is configured to calculate an amount of change Ned of the engine speed Ne to be caused by the sequential shifting operation performed on the basis of the requirement for the shifting operation, namely, calculate a difference Ned of the rotation speed of the engine 14 between the engine speed Ne prior to the sequential shifting operation and the engine speed Ne (a target value thereof) to be established after the sequential shifting operation. The engine speed change amount calculating means 88 calculates the engine speed change amount Ned before initiation of the above-indicated sequential shifting operation. The values of the speed ratio γ0 to be established in the respective speed positions ($1^{st}$ through $4^{th}$ positions) of the first planetary gear set 20 are predetermined, and a speed position SH1 established before the sequential shifting operation (hereinafter referred to as "pre-shifting speed position SH1") and a speed position SH2 to be established after the sequential shifting operation (hereinafter referred to as "post-shifting speed position SH2") are determined upon determination that the vehicle operator has required the shifting operation. Accordingly, the change amount Ned of the engine speed Ne to be caused by the above-indicated sequential shifting operation (hereinafter referred to as "shifting-time engine speed change amount Ned") can be calculated on the basis of the pre-shifting speed position SH1, the post-shifting speed position SH2, the vehicle running speed V upon determination of the requirement for the shifting operation or upon calculation of the above-indicated engine speed change amount Ned, and the gear ratio p0 of the first planetary gear set 20.

The required torque calculating means 90 is operated when the engine speed change amount calculating means 88 has calculated the above-indicated engine speed change amount Ned during shifting. The required torque calculating means 90 is configured to determine a target sequential shifting time period TIMEcgt which is a target value of a sequential shifting time period TIMEcg required from the moment of initiation of the above-indicated sequential shifting operation to the moment of termination of the sequential shifting operation. The required torque calculating means 90 is further configured to calculate to determine a shifting torque Tnd required to change the engine speed Ne from its target value before the shifting operation to its value after the shifting operation, within the target sequential shifting time period TIMEcgt, namely, to determine a total shifting torque Tnd of the engine 14 and the first electric motor MG1 required to change the engine speed Ne from its target value before the shifting operation to its value after the shifting operation. The target sequential shifting time period TIMEcgt and the required shifting torque Tnd are determined at least before the moment of initiation of a change of the engine speed Ne in the sequential shifting operation. The moment of initiation of the sequential shifting operation, which is a start point of time of the sequential shifting time TIMEcg, is the moment of initiation of the change of the engine speed Ne in the sequential shifting operation, while the moment of termination of the sequential shifting operation, which is an end point of time of the sequential shifting time period TIMEcg, is the moment of termination of the change of the engine speed Ne in the sequential shifting operation. For instance, the above-indicated target sequential shifting time period TIMEcgt is predetermined by experimentation, so as to minimize the deterioration of the shifting response and the deterioration of the shifting comfort due to a shifting shock. The target sequential shifting time period TIMEcgt may be determined for each of the speed positions, on the basis of the engine torque Te, vehicle running speed V, etc. prior to the moment of initiation of the sequential shifting operation, or may be a fixed constant value. The required shifting torque Tnd can be calculated on the basis of the target sequential shifting time period TIMEcgt and the shifting-time engine speed change amount Ned, while taking account of an inertia value of the engine 14 and inertia values of rotary members rotating with the engine 14, and a rotary resistance value of the engine 14 and rotary resistance values of the above-indicated rotary members, which inertia and rotary resistance values are predetermined by experimentation. For example, the required shifting torque Tnd increases with a decrease of the target sequential shifting time period TIMEcgt and with an increase of the shifting-time engine speed change amount Ned.

Figure 5:
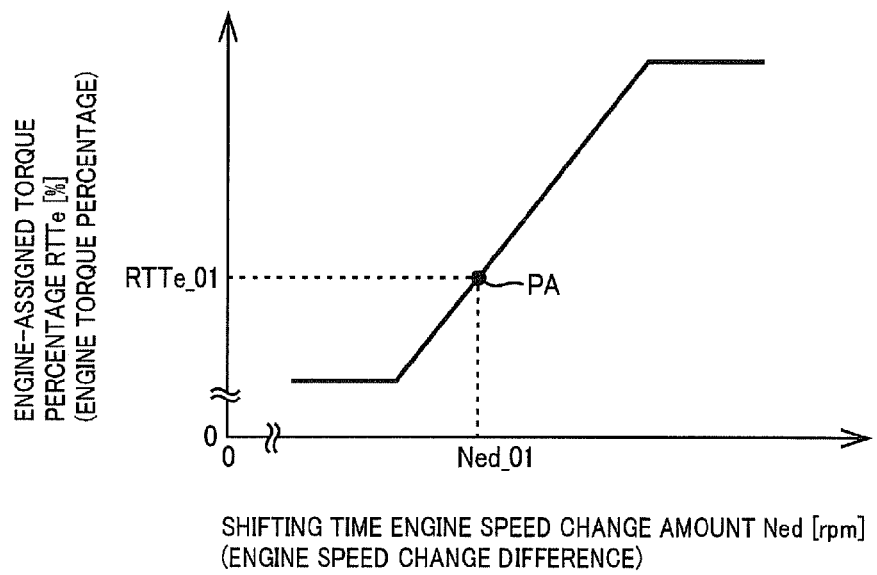
FIG. 5 is an engine-assigned torque percentage calculating map obtained in advance by experimentation, for the electronic control device of FIG. 4 to determine an engine-assigned torque percentage on the basis of an amount of change of the engine speed during a shifting operation.
Figure 6:
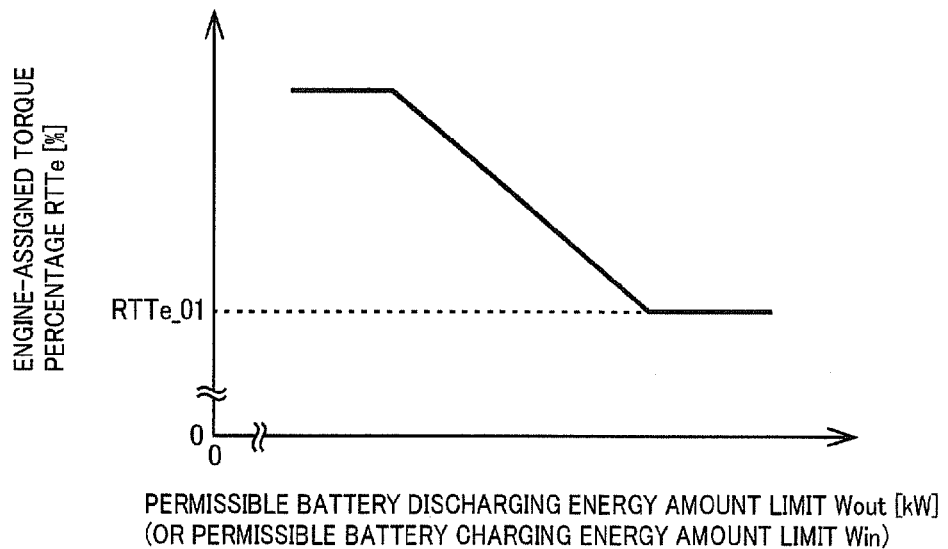
FIG. 6 is an engine-assigned torque percentage calculating map obtained in advance by experimentation, for the electronic control device of FIG. 4 to determine the engine-assigned torque percentage on the basis of a battery discharging energy amount limit.
Figure 7:
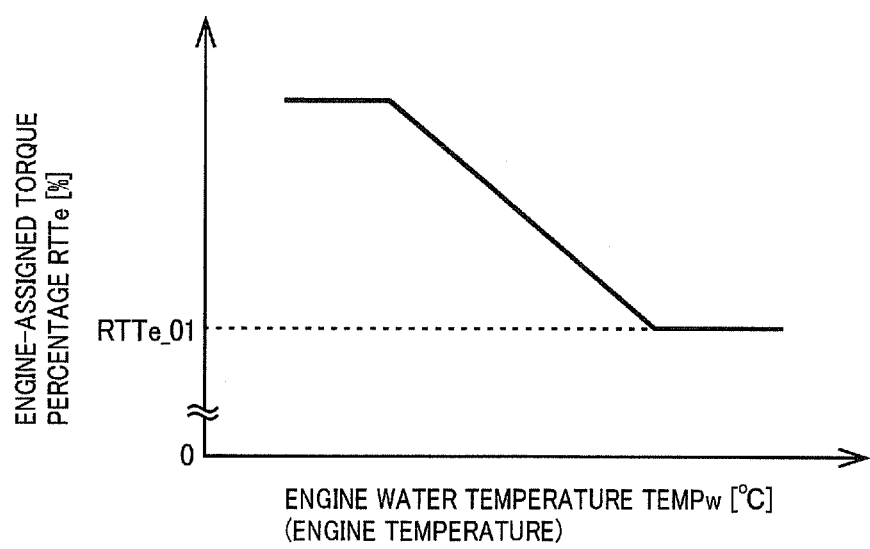
FIG. 7 is an engine-assigned torque percentage calculating map obtained in advance by experimentation, for the electronic control device of FIG. 4 to determine the engine-assigned torque percentage on the basis of a water temperature of the engine.

The torque assignment percentage determining means 92 is operated when the engine speed change amount calculating means 88 has calculated the above-described shifting-time engine speed change amount Ned, and is configured to determine, according to predetermined relationships (maps) indicated in FIGS. 5-7, an engine-assigned torque percentage RTTe (unit: %) which is a torque assigned to the engine 14 and which corresponds to the above-indicated required shifting torque Tnd (total torque amount Tnd), and an electric-motor-assigned torque percentage RTTmg (unit: %) which is a torque assigned to the first electric motor MG1 and which corresponds to the above-indicated required shifting torque Tnd. A sum of the above-indicated engine-assigned torque percentage RTTe and electric-motor-assigned torque percentage RTTmg is equal to 100% (=RTTe+RTTmg). The engine-assigned torque percentage RTTe and electric-motor-assigned torque percentage RTTmg are determined at least before the moment of initiation of the change of the engine speed Ne in the sequential shifting operation, but may be changed depending upon a result of a determination by the shifting delay detecting means 96 during the change of the engine speed Ne in the sequential shifting operation.

FIGS. 5-7 will be described. FIG. 5 is the engine-assigned torque percentage calculating map obtained by experimentation to determine the engine-assigned torque percentage RTTe on the basis of the shifting-time engine speed change amount Ned. FIG. 6 is the engine-assigned torque percentage calculating map obtained by experimentation to determine the engine-assigned torque percentage RTTe on the basis of a permissible battery discharging energy amount limit Wout (unit: kW, for example), which is an upper limit Wout of a permissible amount of discharging of an electric energy of the electric-energy storage device 68 (permissible discharging energy amount limit Wout). FIG. 7 is the engine-assigned torque percentage calculating map obtained by experimentation to determine the engine-assigned torque percentage RTTe on the basis of the engine water temperature $TEMP_W$ indicative of the temperature of the engine 14. The calculating maps of FIGS. 5-7 were obtained by experimentation and set in advance so as to permit an intricate control of the engine speed Ne with a high degree of response during the above-described sequential shifting operation.

As indicated in FIG. 5, the engine-assigned torque percentage RTTe increases with an increase of the shifting-time engine speed change amount Ned, because the inertia torque due to a change of the engine speed Ne increases with the increase of the shifting-time engine speed change amount Ned where the target sequential shifting time period TIMEcgt is held constant, and because the engine 14 can more easily generate a large torque than the first electric motor MG1. When the shifting-time engine speed change amount Ned is Ned_01, for example, the engine-assigned torque percentage RTTe is RTTe_01, as indicated by a point PA in FIG. 5.

As indicated in FIG. 6, the engine-assigned torque percentage RTTe increases with a decrease of the permissible battery discharging energy amount limit Wout, in other words, with an increase of an amount of limitation of discharging of the electric energy of the electric-energy storage device 68, because the sequential shifting time period TIMEcg tends to increase due to difficulty to increase the first electric motor torque $T_{MG1}$, with an increase of the above-indicated limitation of the discharging energy. For this reason, the permissible battery discharging energy amount limit Wout taken along the horizontal axis of FIG. 6 may be replaced by a permissible battery charging energy amount limit Win (unit: kW, for example), which is an upper limit Win of a permissible amount of charging of an electric energy of the electric-energy storage device 68 (permissible charging energy amount limit Win). The first electric motor torque $T_{MG1}$ is limited by the permissible battery discharging energy amount limit Wout or the permissible battery charging energy amount limit Win, depending on the direction of change of the engine speed Ne in the sequential shifting operation and the direction of operation of the first electric motor MG1 during the sequential shifting operation. If the permissible battery charging energy amount limit Win is taken along the horizontal axis of FIG. 6, the engine-assigned torque percentage RTTe increases with a decrease of the permissible battery charging energy amount limit Win, in other words, with an increase of a limitation of the charging energy of the electric-energy storage device 68. It is noted that the permissible battery discharging energy amount limit Wout and the permissible battery charging energy amount limit Win are changed according to the stored energy amount SOC of the electric-energy storage device 68 and the temperature of the electric-energy storage device 68 for assuring durability of the electric-energy storage device 68. According to the example of relationship of FIG. 6 between the permissible battery discharging energy amount limit Wout and the engine-assigned torque percentage RTTe, the value RTTe_01 of the engine-assigned torque percentage RTTe obtained according to the relationship of FIG. 5 is obtained as the smallest value of the engine-assigned torque percentage RTTe determined with FIG. 6.

As indicated in FIG. 7, the engine-assigned torque percentage RTTe increases with a decrease of the temperature of the engine 14, that is, the engine water temperature $TEMP_W$ prior to completion of a warm-up operation of the engine 14, because the sequential shifting time period TIMEcg tends to increase due to an increase of the rotary resistance of the engine 14 with the decrease of the engine water temperature $TEMP_W$. According to the example of relationship of FIG. 7 between the engine water temperature $TEMP_W$ and the engine-assigned torque percentage RTTe, the value RTTe_01 of the engine-assigned torque percentage RTTe obtained according to the relationship of FIG. 5 is obtained as the smallest value of the engine-assigned torque percentage RTTe determined with FIG. 7.

The torque assignment percentage determining means 92 calculates and determines the engine-assigned torque percentage RTTe according to the thus predetermined engine-assigned torque percentage calculating maps of FIGS. 5-7, and on the basis of the shifting-time engine speed change amount Ned, the permissible battery discharging energy amount limit Wout and the engine water temperature TEMP$_W$. The permissible battery charging energy amount limit Win may be taken along the horizontal axis of FIG. 6, so that this permissible battery charging energy amount limit Win is used to calculate the engine-assigned torque percentage RTTe. After calculation of the engine-assigned torque percentage RTTe, the torque assignment percentage determining means 92 calculates and determines the electric-motor-assigned torque percentage RTTmg (=100%–RTTe) on the basis of the calculated engine-assigned torque percentage RTTe.

The engine speed control means 94 is operated when the shifting requirement determining means 86 has determined that the vehicle operator has required the shifting operation, namely, the shifting operation in the above-indicated sequential shifting mode. The engine speed control means 94 is configured to determine the engine torque Te and the first electric motor torque T$_{MG1}$ in the sequential shifting operation, on the basis of the required shifting torque Tnd, the engine-assigned torque percentage RTTe and the electric-motor-assigned torque percentage RTTmg, and to change the engine speed Ne with the determined engine torque Te and first electric motor torque T$_{MG1}$, from the value before the sequential shifting operation to the target value to be established after the sequential shifting operation. Described more specifically, the engine speed control means 94 initially calculates a required engine torque T01e required to be generated by the engine 14 to change the engine speed Ne within the target sequential shifting time period TIMEcgt, from the value before the shifting operation to the target value to be established after the shifting operation, that is, calculates the engine-assigned torque T01e which is a portion of the required shifting torque Tnd that is assigned to the engine 14. The engine speed control means 94 calculates this engine-assigned torque T01e by multiplying the required shifting torque Tnd by the engine-assigned torque percentage RTTe. Then, the engine speed control means 94 calculates a required electric motor torque T01mg required to be generated by the first electric motor MG1 to change the engine speed Ne within the target sequential shifting time period TIMEcgt, from the value before the shifting operation to the target value to be established after the shifting operation, that is, calculates the electric-motor-assigned torque T01mg which is a portion of the required shifting torque Tnd that is assigned to the first electric motor MG1. The engine speed control means 94 calculates this electric-motor-assigned torque T01mg by multiplying the required shifting torque Tnd by the electric-motor-assigned torque percentage RTTmg. Each of these required shifting torque Tnd, required engine torque T01e and required electric motor torque T01mg is a torque about the output shaft 15 of the engine 14, which acts to directly rotate the output shaft 15, in the direction which causes the engine speed Ne to be raised in a shift-down action of the first planetary gear set 20 in which the engine speed Ne is raised, or in the direction which causes the engine speed Ne to be lowered in a shift-up action of the first planetary gear set 20 in which the engine speed Ne is lowered.

Then, the engine speed control means 94 calculates a value of the engine torque Te during the sequential shifting operation (hereinafter referred to as "inter-shifting engine torque Tecg": indicated in FIGS. 9 and 10), by adding the above-indicated required engine torque T01e to the value of the engine torque Te at the moment of initiation of the sequential shifting operation, and calculates a value of the first electric motor torque T$_{MG1}$ during the sequential shifting operation (hereinafter referred to as "inter-shifting first electric motor torque T$_{MG1CG}$": indicated in FIGS. 9 and 10), by adding the above-indicated required electric motor torque T01mg to the value of the first electric motor torque T$_{MG1}$ at the moment of initiation of the sequential shifting operation. Since the first electric motor MG1 is connected to the output shaft 15 of the engine 14 through the first planetary gear set 20, the engine speed control means 94 calculates the value of the first electric motor torque T$_{MG1}$ during the sequential shifting operation, by taking account of the gear ratio ρ0 of the first planetary gear set 20.

After calculation and determination of the inter-shifting engine torque Tecg and inter-shifting first electric motor torque T$_{MG1CG}$ in the manner described above, the engine speed control means 94 commands the engine 14 and the first electric motor MG1 to respectively generate the inter-shifting engine torque Tecg and the inter-shifting first electric motor torque T$_{MG1CG}$, for thereby changing the engine speed Ne from the value before the shifting operation to the target value to be established after the shifting operation, namely, for performing the sequential shifting operation. The engine speed control means 94 detects from time to time the engine speed Ne, and terminates the sequential shifting operation by zeroing the required engine torque T01e and required electric motor torque T01mg, when the detected engine speed Ne has reached the target value to be established after the sequential shifting operation (hereinafter referred to as "target post-shifting engine speed"). Namely, the engine speed control means 94 terminates a change of the engine speed Ne in the sequential shifting operation. For example, the engine speed control means 94 controls the engine torque Te and the first electric motor torque T$_{MG1}$ such that at the moment of termination of the sequential shifting operation, the engine torque Te has been reduced from the inter-shifting engine torque Tecg to the predetermined value to be established after the shifting operation, while the first electric motor torque T$_{MG1}$ has been reduced from the inter-shifting first electric motor torque T$_{MG1CG}$ to the predetermined value to be established after the shifting operation. It is noted that the above-indicated target speed to be established after the sequential shifting operation (target post-shifting engine speed) is equal to the value of the engine speed Ne before the sequential shifting operation, plus the shifting-time engine speed change amount Ned, in the case of a shift-down action of the first planetary gear set 20, or equal to the value of the engine speed Ne before the sequential shifting operation, minus the shifting-time engine speed change amount Ned, in the case of a shift-up action of the first planetary gear set 20.

The shifting delay detecting means 96 is configured to detect a delay of a change of the engine speed Ne in the above-indicated sequential shifting operation i.e. during changing of the engine speed Ne in the sequential shifting operation, and determine whether the sequential shifting operation will be terminated within the target sequential shifting time period TIMEcgt, or not. Namely, the shifting delay detecting means 96 determines whether the sequential shifting operation is delayed or not in the sequential shifting operation. For this determination, the shifting delay detecting means 96 determines and updates from time to time from the moment of initiation of the sequential shifting operation to the moment of termination of the sequential shifting operation, a target inter-shifting engine speed Net, which is the target engine speed during the sequential shifting operation, on the basis of the vale of the engine speed Ne before the sequential shifting operation, the above-indicated target post-shifting engine speed and the target sequential shifting time period TIMEcgt, so that the target post-shifting engine speed is established within the target sequential shifting time period TIMEcgt. For instance, the shifting delay detecting means 96 determines the target inter-shifting engine speed Net as a function of time, on an assumption that the engine speed Ne will change linearly from the value before the sequential shifting operation to the above-indicated target post-shifting engine speed within the target sequential shifting time period TIMEcgt. Further, the shifting delay detecting means 96 detects the engine speed Ne from time to time from the moment of initiation of the sequential shifting operation to the moment of termination of the sequential shifting operation. In the case of the shift-down action of the sequential shifting operation, the shifting delay detecting means 96 determines that the change of the engine speed Ne is delayed, and that the sequential shifting operation will not be terminated within the target sequential shifting time period TIMEcgt, if the engine speed Ne becomes lower than the target inter-shifting engine speed Net by at least a predetermined shifting delay threshold amount LDNe. In the case of the shift-up action of the sequential shifting operation, the shifting delay detecting means 96 determines that the change of the engine speed Ne is delayed, and that the sequential shifting operation will not be terminated within the target sequential shifting time period TIMEcgt, if the engine speed Ne becomes higher than the target inter-shifting engine speed Net by at least a predetermined shifting delay threshold amount LDNe.

The shifting delay detecting means 96 is further configured to determine from time to time during a change of the engine speed Ne in the above-indicated sequential shifting operation, whether the actual engine torque Te or first electric motor torque $T_{MG1}$ is insufficient with respect to the command value (torque command values) applied to the corresponding engine 14 or first electric motor MG1. The engine torque Te and the first electric motor torque $T_{MG1}$ are detected by torque sensors, for example, but may be detected directly or indirectly by other methods. The insufficiency of the actual engine torque Te or first electric motor torque $T_{MG1}$ means insufficiency of the torque which causes a delay of the change of the engine speed Ne in the above-indicated sequential shifting operation, more specifically, insufficiency of the torque in the direction of change of the operating speed of the engine 14 in the sequential shifting operation, in other words, insufficiency of the torque in the positive direction parallel to the direction of change of the operating speed of the engine 14 in the sequential shifting operation.

If the shifting delay detecting means 96 determines during the change of the engine speed Ne in the above-indicated sequential shifting operation that the actual engine torque Te or first electric motor torque $T_{MG1}$ is insufficient with respect to the command value applied to the corresponding engine 14 or first electric motor MG1 and that the sequential shifting operation will not be terminated within the target sequential shifting time period TIMEcgt, the torque assignment percentage determining means 92 changes the already determined engine-assigned torque percentage RTTe and electric-motor-assigned torque percentage RTTmg, during the change of the engine speed Ne. Described more specifically, the torque assignment percentage determining means 92 reduces, during the change of the engine speed Ne, one of the torque assignment percentages of the engine 14 and first electric motor MG1 (engine-assigned torque percentage RTTe or electric-motor-assigned torque percentage RTTmg), which one torque assignment percentage corresponds to one of the engine torque Te and first electric motor torque $T_{MG1}$ an amount of insufficiency of which with respect to the above-indicated command value is larger than the other, such that the reduced value of the torque assignment percentage of the engine 14 or first electric motor MG1 is smaller than the value before the moment of the above-indicated determination by the shifting delay detecting means 96. Further, the torque assignment percentage determining means 92 increases the other of the torque assignment percentages of the engine 14 and first electric motor MG1 such that the increased value is larger than the value before the moment of the determination by the shifting delay detecting means 96. Although the amounts of reduction and increase of the engine-assigned torque percentage RTTe and the electric-motor-assigned torque percentage RTTmg are not particularly limited, one and the other of the torque percentages RTTe and RTTmg may be respectively reduced to 0% and increased to 100%.

Where the torque assignment percentage determining means has changed the engine-assigned torque percentage RTTe and electric-motor-assigned torque percentage RTTmg during the change of the engine speed Ne in response to the determination by the shifting delay detecting means 96, as described above, the engine speed control means 94 re-determines the engine torque Te and first electric motor torque $T_{MG1}$ in the sequential shifting operation, on the basis of the changed engine-assigned torque percentage RTTe and electric-motor-assigned torque percentage RTTmg, and continues the sequential shifting operation with the re-determined engine torque Te and first electric motor torque $T_{MG1}$.

Figure 8:
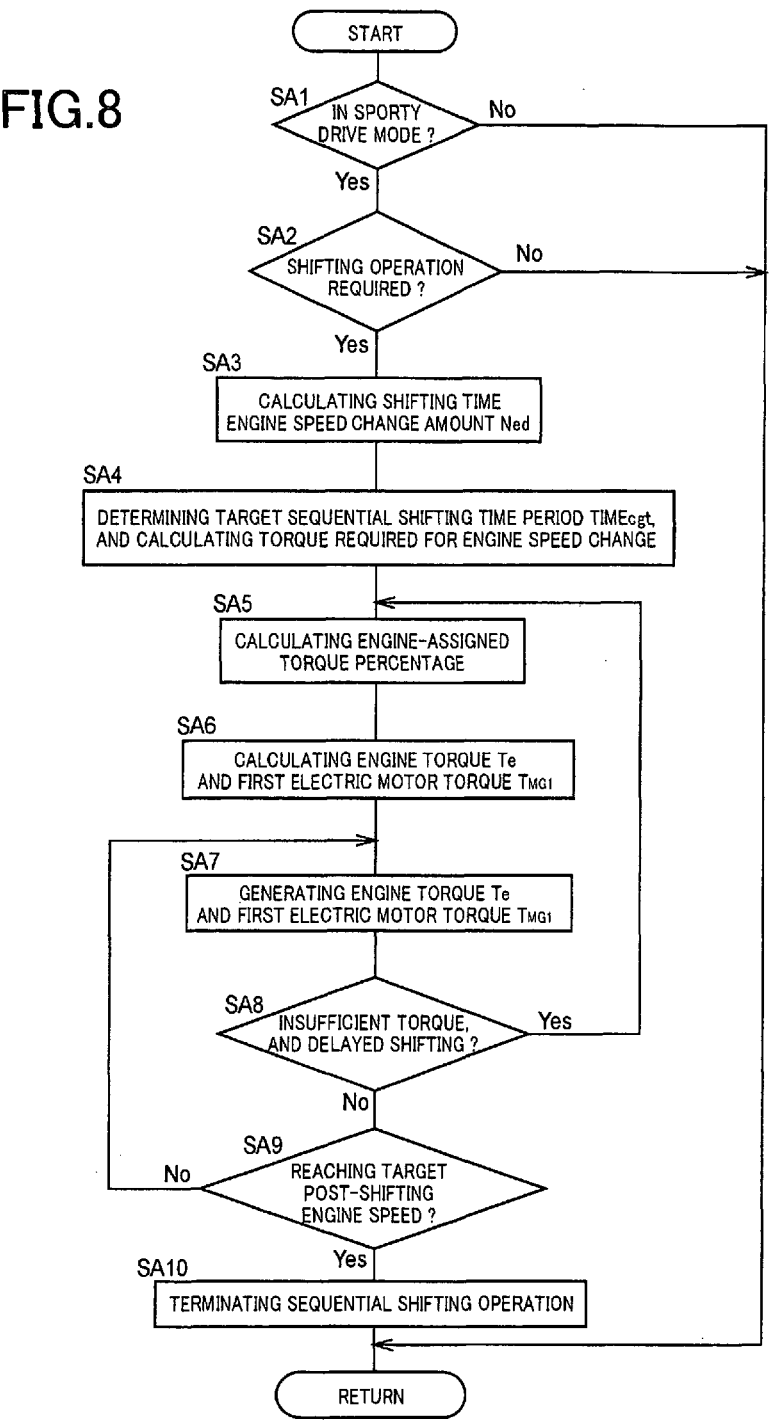
FIG. 8 is a flow chart in embodiment 1 for explaining a major control operation of the electronic control device of FIG. 4, namely, a control operation to implement a sequential shifting operation.

FIG. 8 is the flow chart for explaining a major control operation of the electronic control device 80, namely, a control operation to implement the above-described sequential shifting operation. This control operation is repeatedly performed with an extremely short cycle time of about several milliseconds to about several tens of milliseconds. The present control operation of FIG. 8 is performed independently of or concurrently with other control operations.

Initially, step SA1 (hereinafter "step" being omitted) corresponding to the shifting mode determining means 84 is implemented to determine whether the vehicle 6 is placed in the above-described sequential shifting mode (sporty drive mode). If an affirmative determination is obtained in SA1, that is, if the vehicle 6 is placed in the sequential shifting mode, the control flow goes to SA2. If a negative determination is obtained in SA1, on the other hand, the present control operation is terminated.

SA2 corresponding to the shifting requirement determining means 86 is implemented to determine whether the vehicle operator has required the shifting operation. If an affirmative determination is obtained in SA2, that is, if the vehicle operator has required the shifting operation, the control flow goes to SA3. If a negative determination is obtained in SA2, on the other hand, the present control operation is terminated.

SA3 corresponding to the engine speed change amount calculating means 88 is implemented to calculate the above-indicated shifting-time engine speed change amount Ned on the basis of the above-indicated requirement for the shifting operation of SA2. SA3 is followed by SA4.

SA4 corresponding to the required torque calculating means 90 is implemented to determine the target sequential shifting time period TIMEcgt, and to calculate the torque required to change the engine speed Ne, namely, the above-indicated required shifting torque Tnd, on the basis of the determined target sequential shifting time period TIMEcgt, and the shifting-time engine speed change amount Ned calculated in SA3. SA4 is followed by SA5.

SA5 corresponding to the torque assignment percentage determining means 92 is implemented to calculate and determine the percentage of the engine torque Te with respect to the above-indicated required shifting torque Tnd calculated in SA4, that is, the above-indicated engine-assigned torque percentage RTTe. The above-indicated electric-motor-assigned torque percentage RTTmg is also calculated and determined. If SA5 is implemented again during the sequential shifting operation as a result of an affirmative determination made in SA8 described below, one of the torque assignment percentages of the engine 14 and first electric motor MG1 (engine-assigned torque percentage RTTe or electric-motor-assigned torque percentage RTTmg), which one torque assignment percentage corresponds to one of the engine torque Te and first electric motor torque $T_{MG1}$ an amount of insufficiency of which is larger is reduced during the change of the engine speed Ne, while the other of the torque assignment percentages of the engine 14 and first electric motor MG1 is increased. SA5 is followed by SA6.

SA6 corresponding to the engine speed control means 94 is implemented to calculate and determine the engine torque Te and the first electric motor torque $T_{MG1}$ during the above-indicated sequential shifting operation, on the basis of the required shifting torque Tnd, the engine-assigned torque percentage RTTe and the electric-motor-assigned torque percentage RTTmg. SA6 is followed by SA7.

SA7 corresponding to the engine speed control means 94 is implemented to generate the engine torque Te and first electric motor torque $T_{MG1}$ determined in SA6. SA7 is followed by SA8.

SA8 corresponding to the shifting delay detecting means 96 is implemented to determine whether the actual engine torque Te or first electric motor torque $T_{MG1}$ is insufficient and the shifting operation of the first planetary gear set 20 is delayed. The determination that the shifting operation is delayed is made if it is determined that the above-indicated sequential shifting operation will not be terminated within the target sequential shifting time period TIMEcgt. If the affirmative determination is obtained in SA8, that is, if the actual engine torque Te or first electric motor torque $T_{MG1}$ is insufficient and the shifting operation is delayed, the control flow goes back to SA5. If a negative determination is obtained in SA8, the control flow goes to SA9.

SA9 corresponding to the engine speed control means 94 is implemented to determine whether the engine speed Ne has reached the above-indicated target post-shifting engine speed. If an affirmative determination is obtained in SA9, that is, if the engine speed Ne has reached the above-indicated target post-shifting engine speed, the control flow goes to SA10. If a negative determination is obtained in SA9, the control flow goes back to SA7.

SA10 corresponding to the engine speed control means 94 is implemented to terminate the above-indicated sequential shifting operation.

Figure 9:
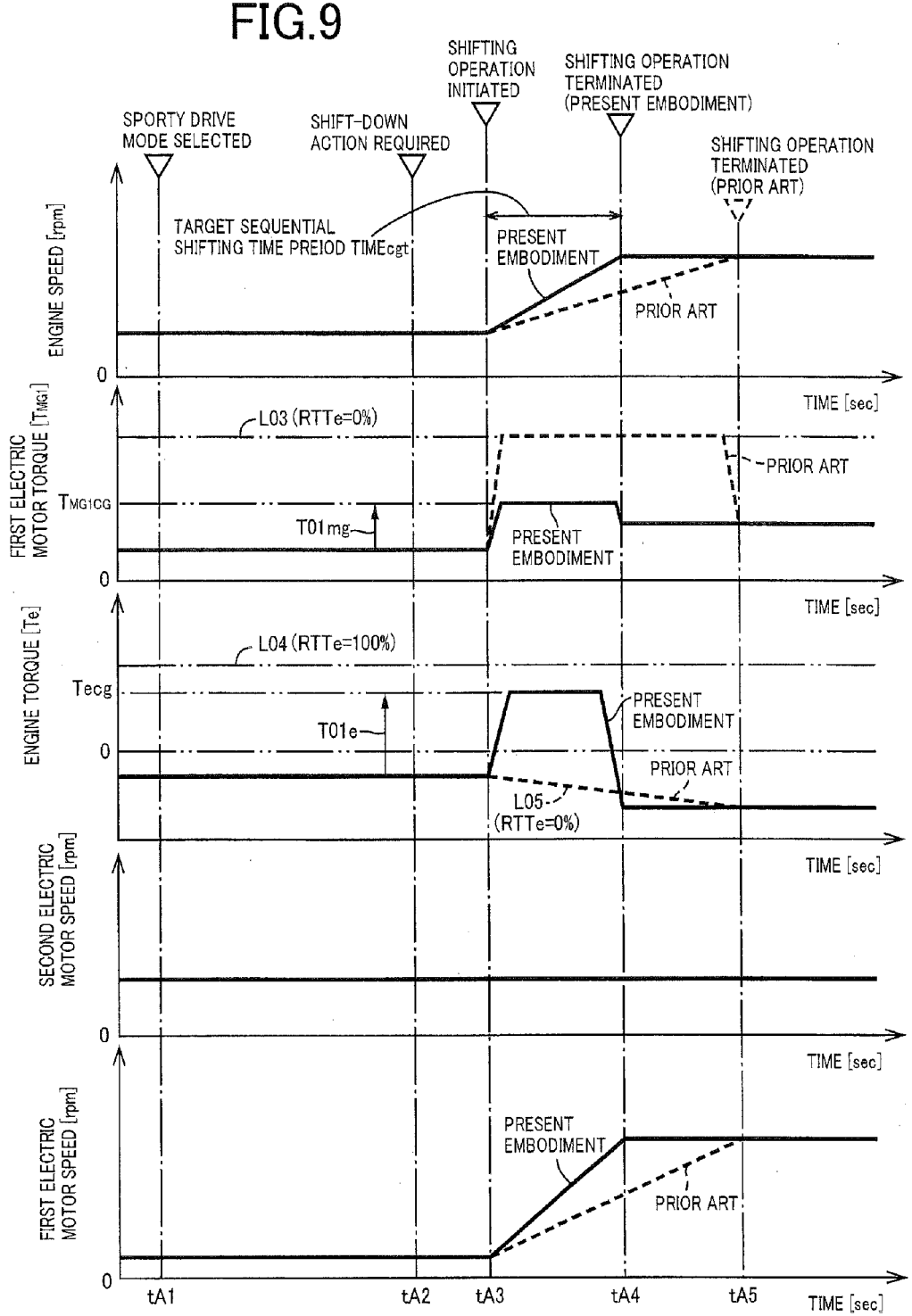
FIG. 9 is a first time chart for explaining a control operation of the electronic control device of FIG. 4 according to the first embodiment, more specifically, an operation to control the torques of the engine and a first electric motor in the above-indicated sequential shifting operation in the form of a shift-down action (sequential shift-down action) performed during a coasting run of the vehicle with an accelerator pedal held in its released position.

FIG. 9 is the time chart for explaining an operation to control the torques of the engine 14 and the first electric motor MG1 in the above-indicated sequential shifting operation in the form of a shift-down action (sequential shift-down action) performed during a coasting run of the vehicle with the accelerator pedal 60 held in its released position. In FIG. 9, solid lines show the control according to the present embodiment while broken lines show the control according to the prior art. According to the prior art, the engine torque Te is not used to change the engine speed Ne in the above-indicated sequential shifting operation, but the engine speed Ne is changed solely by the first electric motor torque $T_{MG1}$ in the sequential shifting operation and the sequential shifting operation is performed. This prior art is also shown in the time chart of FIG. 10. In FIG. 9, a two-dot chain line L03 represents the first electric motor torque $T_{MG1}$ when the above-indicated engine-assigned torque percentage RTTe is 0%, and a two-dot chain line L04 represents the engine torque Te when the above-indicated engine-assigned torque percentage RTTe is 100%, while a broken line L05 represents the engine torque Te when the above-indicated engine-assigned torque percentage RTTe is 0%. In the example of FIG. 9, the accelerator pedal operation amount Acc is held at zero. Since the second electric motor speed $N_{MG2}$ is held constant in the example of the time chart of FIG. 9, the vehicle running speed V is held constant. Before a point of time tA3 and after a point of time tA4 indicated in the time chart, the engine torque Te (indicated by a solid line) is negative, so that the engine 14 functions as a load, providing a so-called "engine braking" effect. At a point of time tA1, the vehicle 6 is placed in the above-indicated sequential shifting mode (sporty drive mode), so that the affirmative determination is obtained in SA1 of FIG. 8 at the point of time tA1.

At a point of time tA2 in FIG. 9, the above-indicated requirement for the shifting operation, more specifically, the requirement for a shift-down action of the first planetary gear set 20 is made by an operation of the shift lever 46 to the "−" position (shown in FIG. 2), for example, so that the affirmative determination is obtained in SA2 of FIG. 8. According to the present embodiment, the above-indicated sequential shifting operation, more specifically, the sequential shift-down action is initiated at the point of time tA3, and terminated at the point of time tA4. According to the prior art, on the other hand, the above-indicated sequential shifting operation is also initiated at the point of time tA3, but is terminated at a point of time tA5 after the point of time tA4. The engine speed Ne is raised to the above-indicated target post-shifting engine speed while the first electric motor speed $N_{MG1}$ is synchronously raised, during the above-indicated sequential shifting operation, namely, during a time period from the point of time tA3 to the point of time tA4 in the present embodiment, and during a time period from the point of time tA3 to the point of time tA5 in the prior art. According to the present embodiment, the sequential shifting operation is not delayed, that is, the sequential shifting time period TIMEcg from the point of time tA3 to the point of time tA4 is coincident with the target sequential shifting time period TIMEcgt, as is apparent from a change of the engine speed Ne indicated in the time chart.

According to the prior art indicated by the broken lines in FIG. 9, the engine torque Te is not changed to raise the engine speed Ne, during the sequential shifting operation (from the point of time tA3 to the point of time tA5), but the first electric motor torque $T_{MG1}$ is increased with respect to the value prior to the moment of initiation of the shifting operation, so that an increase of the first electric motor torque $T_{MG1}$ permits a rise of the engine speed Ne during the sequential shifting operation. According to the present embodiment, on the other hand, the engine speed Ne is raised by increasing both the engine torque Te and the first electric motor torque $T_{MG1}$ with respect to the values prior to the moment of initiation of the sequential shifting operation, during the sequential shifting operation (from the point of time tA3 to the point of time tA4) as shown with a solid line in FIG. 9. At this time, the engine-assigned torque percentage RTTe is determined to be 80%, for instance, while the electric-motor-assigned torque percentage RTTmg is determined to be 20%, for instance. Thus, the present embodiment is configured to suitably determine the engine-assigned torque percentage RTTe, and change the engine speed Ne by utilizing the engine torque Te during the above-indicated sequential shifting operation, so that the sequential shifting time period TIMEcg can be made shorter than in the prior art. Accordingly, the present embodiment permits improvements of the response of the sequential shifting operation and the drivability of the vehicle.

Figure 10:
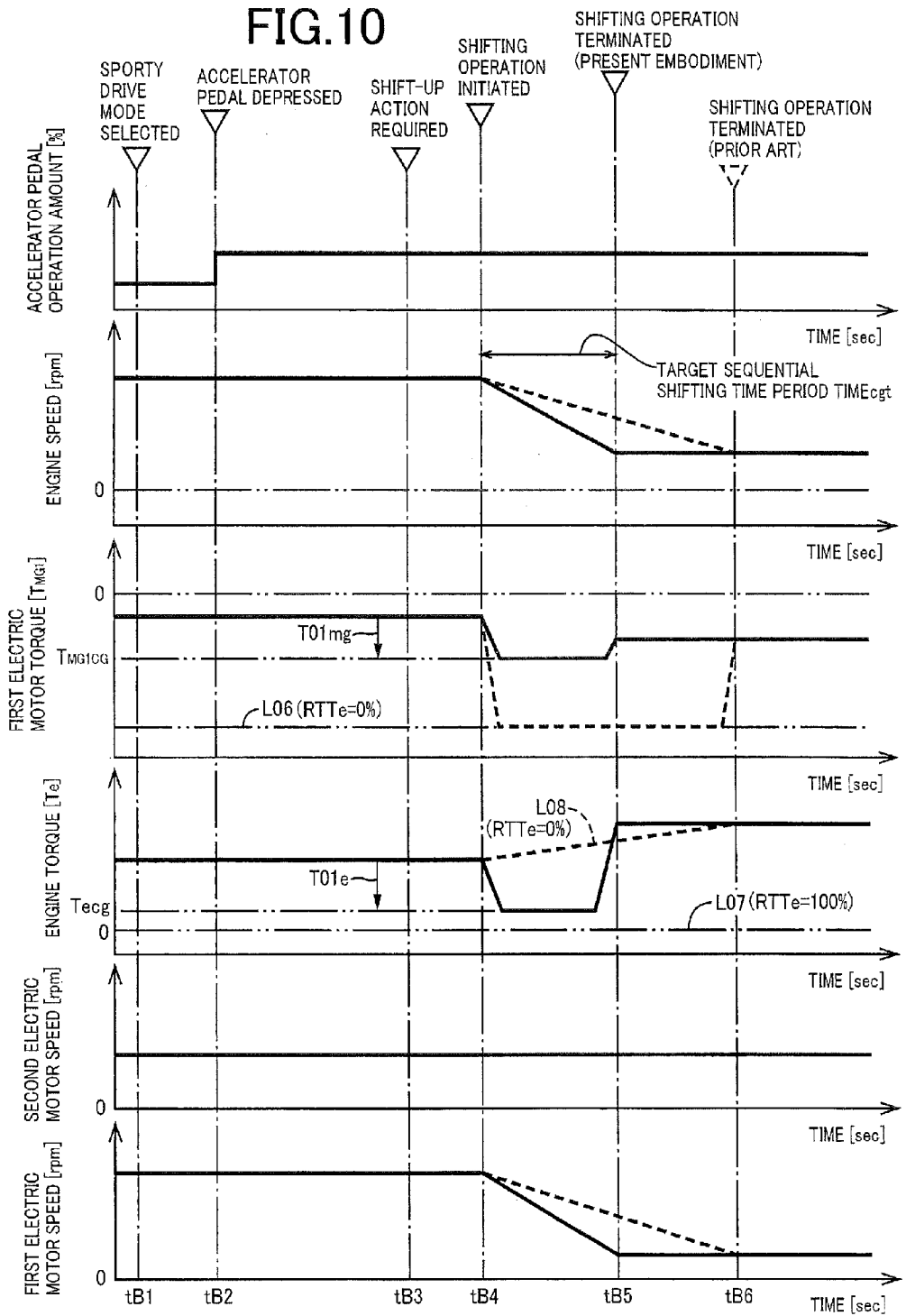
FIG. 10 is a second time chart for explaining a control operation of the electronic control device of FIG. 4 according to the first embodiment, more specifically, an operation to control the torques of the engine and the first electric motor in the sequential shifting operation in the form of a shift-up action (sequential shift-up action) performed during an accelerating run of the vehicle with the accelerator pedal held in an operated position.

FIG. 10 is the time chart for explaining an operation to control the torques of the engine 14 and the first electric motor MG1 in the above-indicated sequential shifting operation in the form of a shift-up action (sequential shift-up action) performed during an accelerating run of the vehicle with the accelerator pedal 60 held in an operated position. In FIG. 10, solid lines show the control according to the present embodiment while broken lines show the control according to the prior art, as in FIG. 9. In FIG. 10, a two-dot chain line L06 represents the first electric motor torque $T_{MG1}$ when the above-indicated engine-assigned torque percentage RTTe is 0%, and a two-dot chain line L07 represents the engine torque Te when the above-indicated engine-assigned torque percentage RTTe is 100%, while a two-dot chain line L08 represents the engine torque Te when the above-indicated engine-assigned torque percentage RTTe is 0%. In the example of the time chart of FIG. 10, the second electric motor speed $N_{MG2}$ is held constant so that the vehicle running speed V is held constant. At a point of time tB1, the vehicle 6 is placed in the above-indicated sequential shifting mode (sporty drive mode), so that the affirmative determination is obtained in SA1 of FIG. 8 at the point of time tB1. At a point of time tB2, the accelerator pedal 60 is depressed and detected to be in an on-state, that is, the vehicle operator has required acceleration of the vehicle.

At a point of time tB3 of FIG. 10, the shifting requirement substantially the shifting-up requirement for a shift-up action of the first planetary gear set 20 is made by an operation of the shift lever 46 to the "+" position (shown in FIG. 2), for example, so that the affirmative determination is obtained in SA2 of FIG. 8. According to the present embodiment, the above-indicated sequential shifting operation, more specifically, the sequential shift-up action is initiated at a point of time tB4, and terminated at a point of time tB5. According to the prior art, on the other hand, the above-indicated sequential shifting operation is also initiated at the point of time tB4, but is terminated at a point of time tB6 after the point of time tB5. The engine speed Ne is lowered to the above-indicated target post-shifting engine speed while the first electric motor speed $N_{MG1}$ is synchronously lowered, during the above-indicated sequential shifting operation, namely, during a time period from the point of time tB4 to the point of time tB5 in the present embodiment, and during a time period from the point of time tB4 to a point of time tB6 in the prior art. According to the present embodiment, the sequential shifting operation is not delayed, that is, the sequential shifting time period TIMEcg from the point of time tB4 to the point of time tB5 is coincident with the target sequential shifting time period TIMEcgt, as is apparent from a change of the engine speed Ne indicated in the time chart.

According to the prior art indicated by the broken lines in FIG. 10, the engine torque Te is not changed to raise the engine speed Ne, during the sequential shifting operation (from the point of time tB4 to the point of time tB6), but the first electric motor torque $T_{MG1}$ is lowered with respect to the value prior to the moment of initiation of the shifting operation, so that a decrease of only the first electric motor torque $T_{MG1}$ permits a drop of the engine speed Ne during the sequential shifting operation. According to the present embodiment as shown in FIG. 10 with a solid line, on the other hand, the engine speed Ne is decreased by reducing both the engine torque Te and the first electric motor torque $T_{MG1}$ with respect to the values prior to the moment of initiation of the sequential shifting operation, during the sequential shifting operation (from the point of time tB4 to the point of time tB5). At this time, the engine-assigned torque percentage RTTe is determined to be 80%, for instance, while the electric-motor-assigned torque percentage RTTmg is determined to be 20%, for instance. Thus, like the sequential shifting operation shown in FIG. 9, the sequential shifting operation shown in FIG. 10 can be performed so as to make the sequential shifting time period TIMEcg shorter than in the prior art. Accordingly, the present embodiment permits improvements of the response of the sequential shifting operation and the drivability of the vehicle.

Figure 11:
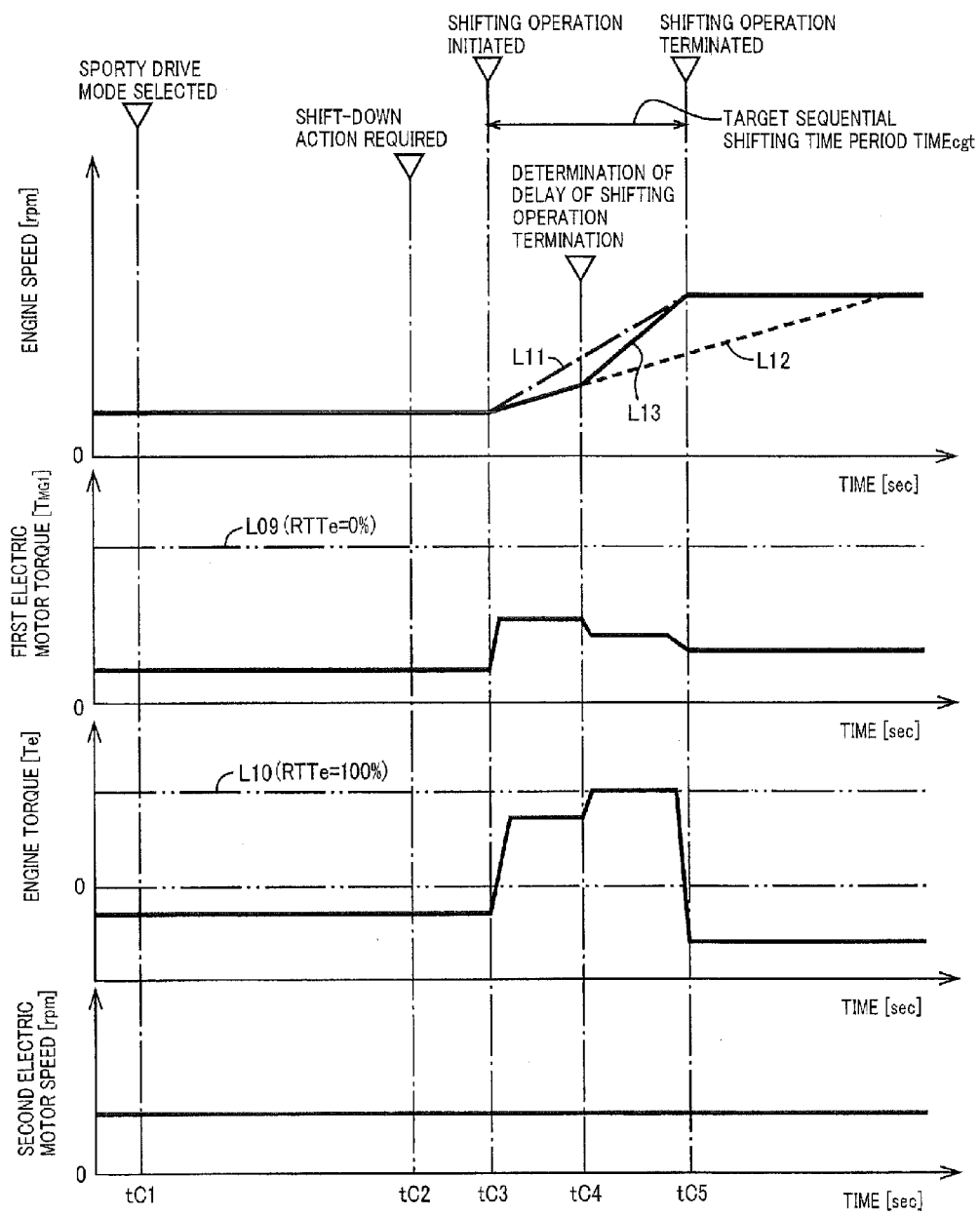
FIG. 11 is a third time chart for explaining a control operation of the electronic control device of FIG. 4 according to the first embodiment, more specifically, an operation to control the torques of the engine and the first electric motor in the sequential shifting operation in the form of a shift-down action (sequential shift-down action) performed during the above-indicated coasting run of the vehicle, where a delay of the sequential shifting operation is detected.

FIG. 11 is the time chart for explaining an operation to control the torques of the engine 14 and the first electric motor MG1 in the above-indicated sequential shifting operation in the form of a shift-down action (sequential shift-down action) performed during a coasting run of the vehicle with the accelerator pedal 60 held in the released position, where a delay of the sequential shifting operation is detected. In the example of FIG. 11, the first electric motor torque $T_{MG1}$ has a larger amount of variation with respect to the above-indicated commanded torque value, than the engine torque Te, and the torque required to change the engine speed Ne becomes insufficient due to the variation of the first electric motor torque $T_{MG1}$ during the sequential shifting operation. In FIG. 11, a two-dot chain line L09 represents the first electric motor torque $T_{MG1}$ when the above-indicated engine-assigned torque percentage RTTe is 0%, and a two-dot chain line L10 represents the engine torque Te when the above-indicated engine-assigned torque percentage RTTe is 100%. In the example of FIG. 11, the accelerator pedal operation amount Acc is held at zero. Since the second electric motor speed $N_{MG2}$ is held constant in the example of the time chart of FIG. 11, the vehicle running speed V is held constant. Before a point of time tC3 and after a point of time tC5 indicated in the time chart, the engine torque Te (indicated by a solid line) is negative, so that the engine 14 functions as a load, providing a so-called "engine braking" effect. At a point of time tC1, the vehicle 6 is placed in the above-indicated sequential shifting mode (sporty drive mode), so that the affirmative determination is obtained in SA1 of FIG. 8 at the point of time tC1.

At a point of time tC2 in FIG. 11, the above-indicated requirement for the shifting operation, more specifically, the requirement for a shift-down action of the first planetary gear set 20 is made by an operation of the shift lever 46 to the "−" position (shown in FIG. 2), for example, so that the affirmative determination is obtained in SA2 of FIG. 8. The above-indicated sequential shifting operation, more specifically, the sequential shift-down action is initiated at the point of time tC3, and terminated at the point of time tC5. A one-dot chain line L11 represents the above-indicated target inter-shifting engine speed Net during a time period between the moments of initiation and termination of the sequential shifting operation. As shown in FIG. 11, the engine speed Ne is kept lower than the target inter-shifting engine speed Net from a point of time tC3, that is, the moment of initiation of a rise of the engine speed Ne, such that a difference between the engine speed Ne and the target inter-shifting engine speed Net increases as a function of time. At a point of time tC4, the difference of the engine speed Ne with respect to the target inter-shifting engine speed Net is not smaller than the above-indicated shifting delay threshold amount LDNe. In addition, the first electric motor torque $T_{MG1}$ is insufficient due to its variation. As a result, the affirmative determination that the shifting operation of the first planetary gear set 20 is delayed is obtained in SA8 of FIG. 8 at the point of time tC4. At the point of time tC4, the electric-motor-assigned torque percentage RTTmg and the engine-assigned torque percentage RTTe are re-determined in SA5 of FIG. 8, such that the electric-motor-assigned torque percentage RTTmg is lowered with respect to the value at or prior to the point of time tC4, while the engine-assigned torque percentage RTTe is raised with respect to the value at or prior to the point of time tC4. In the example of FIG. 11, the electric-motor-assigned torque percentage RTTmg is 20% while the engine-assigned torque percentage RTTe is 80% during a time period between the points of time tC3 and tC4, and the electric-motor-assigned torque percentage RTTmg is 0% while the engine-assigned torque percentage RTTe is 100% during a time period between the points of time tC4 and tC5. Accordingly, the first electric motor torque $T_{MG1}$ during the time period between the points of time tC4 and tC5 is made smaller than that during the time period between the points of time tC3 and tC4, while the engine torque Te during the time period between the points of time tC4 and tC5 is made larger than that during the time period between the points of time tC3 and tC4, as indicated in FIG. 11. It is considered that in the absence of these changes of the first electric motor torque $T_{MG1}$ and engine torque Te at the point of time tC4, the engine speed Ne would be raised as shown with a broken line L12 at a rate which is too low to terminate the above-indicated sequential shifting operation at the point of time tC5, namely, within the above-indicated target sequential shifting time period TIMEcgt. However, the above-indicated changes of the first electric motor torque $T_{MG1}$ and engine torque Te at the point of time tC4 permit the engine speed Ne to be raised from the point of time tC4 at a rate higher than a rate represented by the broken line L12, that is, raised during the time period between the points of time tC4 and tC5, at a rate represented by a solid line L13, so that the above-indicated sequential shifting operation, which is initiated at the point of time tC3, is terminated within the above-indicated target sequential shifting time period TIMEcgt.

The present embodiment is configured such that the engine speed control means 94 changes the engine speed Ne in the above-indicated sequential shifting operation, with at least one of the torques Te and $T_{MG1}$ assigned to be respectively generated by the engine 14 and the first electric motor MG1, and such that the percentage of the torque assigned to the engine 14 (engine-assigned torque percentage RTTe) with respect to the total torque Tnd of the engine 14 and first electric motor MG1 required to change the engine speed Ne in the above-indicated sequential shifting operation is increased with an increase of the shifting-time engine speed change amount Ned which is an amount of change of the operating speed of the engine 14 as shown in FIG. 5. Accordingly, the engine speed Ne can be changed with a progress of the above-indicated sequential shifting operation, by positively utilizing the torque of the engine 14 which increases with an increase of the engine-assigned torque percentage RTTe, whereby it is possible to minimize an increase of the above-indicated sequential shifting time period TIMEcg due to a large value of the engine speed change amount Ned, assuring a sufficiently high degree of response of the vehicle 6 to the operation by the vehicle operator. Namely, the drivability of the vehicle 6 in the above-indicated sequential shifting operation can be improved.

The present embodiment is further configured to determine the engine-assigned torque percentage RTTe in the above-indicated sequential shifting operation such that the engine-assigned torque percentage RTTe increases with an increase of an amount of limitation of charging or discharging of the electric energy of the electric-energy storage device 68, as shown in FIG. 6 by way of example. Accordingly, the engine speed Ne can be changed with the engine torque Te at a sufficiently high rate, even when there is a risk that the first electric motor torque $T_{MG1}$ is insufficient to change the engine speed Ne at a high rate in the above-indicated sequential shifting operation, due to limitation of charging or discharging of the electric energy of the electric-energy storage device 68. Therefore, it is possible to minimize an increase of the above-indicated sequential shifting time period TIMEcg.

The present embodiment is further configured to determine the engine-assigned torque percentage RTTe in the above-indicated sequential shifting operation such that the engine-assigned torque percentage RTTe increases with a decrease of the engine water temperature $TEMP_W$ which is the temperature of the engine 14 as shown in FIG. 7. Accordingly, the engine speed Ne can be changed with the engine torque Te at a sufficiently high rate, even when there is a difficulty of change of the engine speed Ne at a high rate in the above-indicated sequential shifting operation due to a large rotary resistance (friction) of the engine 14 at a low temperature of the engine 14. Therefore, it is possible to minimize an increase of the above-indicated sequential shifting time period TIMEcg. When the temperature of the engine 14 is low with an insufficient warm-up operation thereof, for example, the rotary resistance of the engine 14 is relatively large. The present embodiment is therefore configured to determine the engine-assigned torque percentage RTTe such that the engine-assigned torque percentage RTTe taken along the vertical axis of FIG. 7 is higher before the warm-up operation than after the warm-up operation, as shown in FIG. 7.

The present embodiment is further configured such that when a determination is made that the torque of the engine 14 or the first electric motor MG1 during a change of the operating speed of the engine 14 in the above-indicated sequential shifting operation is insufficient and that the sequential shifting operation will not be terminated within the above-indicated predetermined target sequential shifting time period TIMEcgt, the percentage RTTe or RTTmg of one of the torques of the engine 14 and the first electric motor MG1 an amount of insufficiency of which is larger than the other is reduced during varying of the engine rotation speed Ne with respect to a value before the moment of the determination. Accordingly, the sequential shifting operation can be terminated within the target sequential shifting time period TIMEcgt with a higher degree of stability, than where the determination as to whether the above-indicated sequential shifting operation will be terminated within the above-indicated target sequential shifting time period TIMEcgt is not made. In this respect, the drivability of the vehicle can be improved.

The present embodiment is also configured such that the above-indicated sequential shifting operation in which the engine-assigned torque percentage RTTe is determined according to the shifting-time engine speed change amount Ned, etc. is either the above-described sequential shift-down action which causes a rise of the engine speed Ne with respect to a value before the moment of initiation of the shifting operation and which takes place during a coasting run of the vehicle 6, as shown in FIG. 9 by way of example, or the above-described sequential shift-up action which causes a drop of the engine speed Ne with respect to the value before the moment of initiation of the shifting operation and which takes place during an accelerating run of the vehicle 6, as shown in FIG. 10 by way of example. Accordingly, it is possible to improve the operating response of the vehicle 6, during the sequential shifting operation in which the vehicle operator particularly desires a high degree of the operating response of the vehicle 6, whereby the drivability of the vehicle 6 in the sequential shifting operation can be effectively improved.

The present embodiment is further configured to determine the engine-assigned torque percentage RTTe in the above-described sequential shifting operation, according to the predetermined relationships and on the basis of running conditions of the vehicle 6. For instance, the running condition includes at least one of the shifting-time engine speed change amount Ned, the permissible battery discharging energy amount limit Wout, the permissible battery charging energy amount limit Win and the temperature of the engine 14, in the above-indicated sequential shifting operation. Accordingly, the above-described engine-assigned torque percentage RTTe can be easily and adequately determined prior to the moment of initiation of the sequential shifting operation.

Then, the other embodiments of this invention will be described. It is noted that the same reference signs will be used to identify the corresponding elements of the different embodiments, which will not be described redundantly.

Second Embodiment

Figure 12:
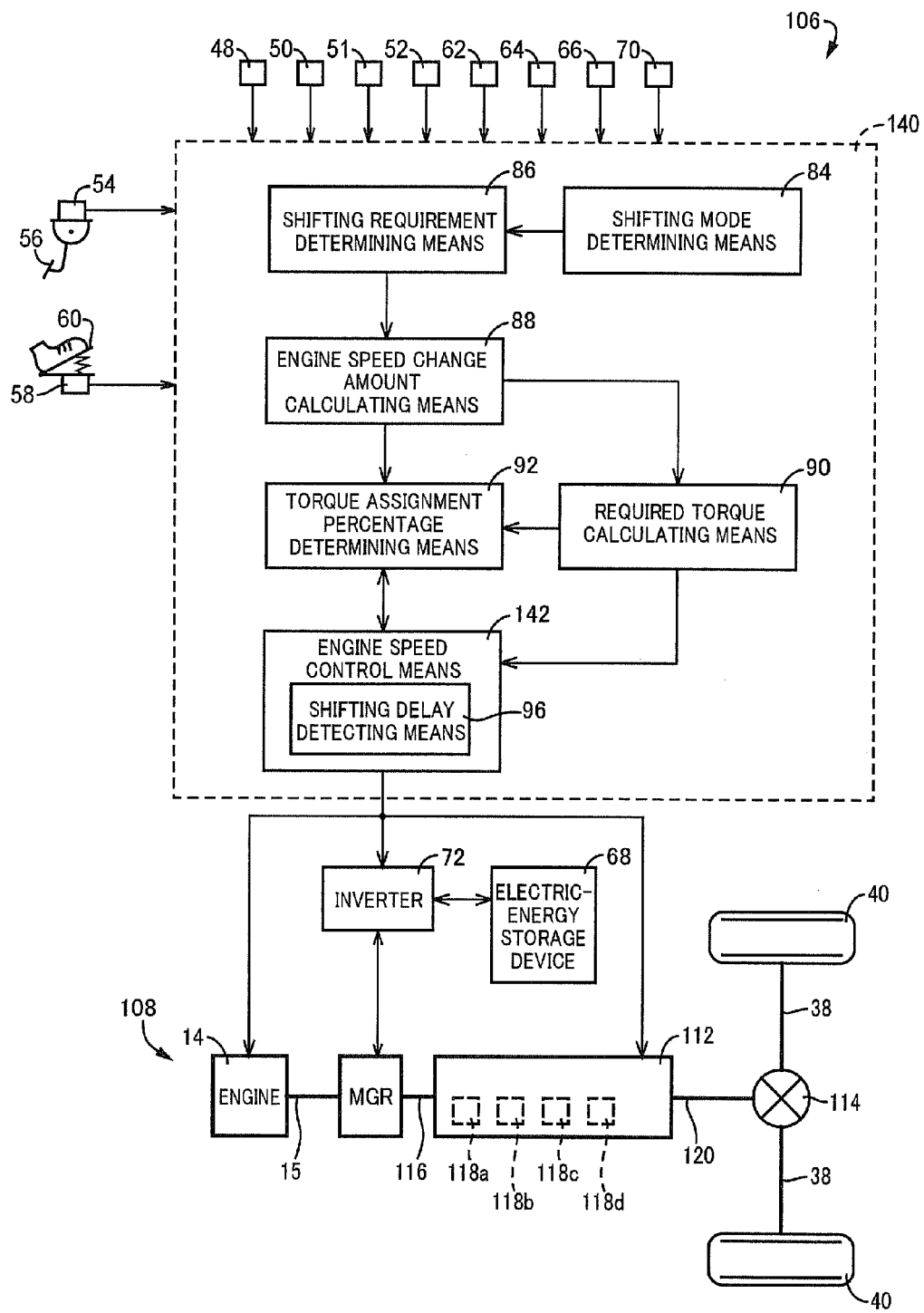
FIG. 12 is a schematic view for explaining a drive system of a hybrid vehicle according to a second embodiment of the invention, and is a functional block diagram for explaining major control functions of an electronic control device provided to control the vehicular drive system.

Aspects of the second embodiment different from the first embodiment will be primarily described. FIG. 12 is the schematic view for explaining a vehicular drive system 108 of a hybrid vehicle 106 (hereinafter referred to as a "vehicle 106") according to the second embodiment, and is the functional block diagram for explaining major control functions of an electronic control device 140 provided to control the vehicular drive system 108. As shown in FIG. 12, the vehicular drive system 108 is provided with the engine 14, a vehicle driving electric motor MGR (electric motor provided according to the present invention), a step-variable automatic transmission 112, a differential gear device 114 equivalent to the differential gear device 36 in the first embodiment, the inverter 72, and the electric-energy storage device 68 electrically connected to the vehicle driving electric motor MGR through the inverter 72. The engine 14, vehicle driving electric motor MGR, automatic transmission 112, differential gear device 114 and drive wheels 40 are connected in series with each other.

This vehicular drive system 108 is installed longitudinally in a front portion of the vehicle 106, which is of an FR (front-engine rear-drive) type, for example, and is suitably usable to drive the drive wheels 40. In the vehicular drive system 108, the drive force of the engine 14 is transmitted from an input shaft 116 of the automatic transmission 112 to the pair of drive wheels 40 through the automatic transmission 112, differential gear device 114 and the pair of axles 38, in the order of description. The drive force of the vehicle driving electric motor MGR is also transmitted from the above-indicated transmission input shaft 116 to the pair of drive wheels 40 through the automatic transmission 112, differential gear device 114 and pair of axles 38 in the order of description.

The vehicle driving electric motor MGR is a motor/generator, like the first electric motor MG1 and the second electric motor MG2 in the first embodiment. Accordingly, the vehicle driving electric motor MGR can drive the drive wheels 40, and apply a braking force to the drive wheels 40 with a regenerative operation during running of the vehicle, for example. Further, the vehicle driving electric motor MGR, which is connected also to the output shaft 15 of the engine 14, can positively change the engine speed Ne in the process of shifting of the automatic transmission 112, for instance. While the first electric motor MG1 is used as an electric motor outputting torque for changing the engine speed Ne in the above-indicated sequential shifting operation in the first embodiment, the vehicle driving electric motor MGR is used as this electric motor in the present embodiment.

The automatic transmission 112, which corresponds to the first planetary gear set 20 in the first embodiment, serves as a transmission mechanism constituting a part of a power transmitting path between the engine 14 and the drive wheels 40. Described more specifically, the automatic transmission 112 is a step-variable transmission provided with a plurality of planetary gear sets, and a plurality of coupling elements 118a, 118b, 118c and 118d (hereinafter referred as "coupling elements 118" unless otherwise specified). Each of the coupling elements 118 is a wet-type multiple-disc clutch or brake hydraulically placed in its engaged and released states. The automatic transmission 112 performs clutch-to-clutch shifting actions with the engaging and releasing actions of selected ones of the coupling elements 118. Namely, each clutch-to-clutch shifting action is implemented by the engaging action of one of the coupling elements and the releasing action of another of the coupling elements. The above-indicated one coupling element has been placed in the released state before the shifting action of the automatic transmission 112 and is placed in the engaged state after the shifting action, while the above-indicated another coupling element has been placed in the engaged state before the shifting action and is placed in the released state after the shifting action. These two different coupling elements are selected from the above-indicated plurality of coupling elements 118.

The automatic transmission 112 is a transmission having a plurality of speed positions, for instance, four speed positions consisting of a first speed position ($1^{st}$), a second speed position ($2^{nd}$), a third speed position ($3^{rd}$) and a fourth speed position ($4^{th}$), for example. The first speed position is the lowest speed position. The speed positions of the automatic transmission 112 have respective values of a speed ratio $\gamma_{AT}$ (=rotating speed of the transmission input shaft 116/rotating speed of a transmission output shaft 120), which values increase in steps (in a discrete manner), for example, in a geometrical manner, from the side of the first speed position. Accordingly, a difference between the speed ratio $\gamma_{AT}$ of the above-indicated first speed position and the speed ratio $\gamma_{AT}$ of the above-indicated second speed position is larger than a difference between the speed ratio $\gamma_{AT}$ of the above-indicated second speed position and the speed ratio $\gamma_{AT}$ of the above-indicated third speed position, which difference is larger than a difference between the speed ratio $\gamma_{AT}$ of the above-indicated third speed position and the speed ratio $\gamma_{AT}$ of the above-indicated fourth speed position. That is, an amount of change of the speed ratio caused by a shifting action of the automatic transmission 112 is larger when the shifting action takes place between the relatively low speed positions than between the relatively high speed positions.

When the selected shift position $P_{SH}$ of the shift lever 46 (see FIG. 2) is the automatic forward-drive position "D", the automatic transmission 112 is automatically shifted on the basis of the vehicle running speed V and the accelerator pedal operation amount Acc. When the above-indicated selected shift position $P_{SH}$ is the manual forward-drive position "M", the automatic transmission 112 is shifted up by one position each time the shift lever 46 is operated to the "+" position, and is shifted down by one position each time the shift lever 46 is operated to the "−" position. The shifting action of the automatic transmission 112 which takes place when the selected shift position $P_{SH}$ is the manual forward-drive position "M" corresponds to the sequential shifting operation explained in above embodiment 1.

Figure 13:
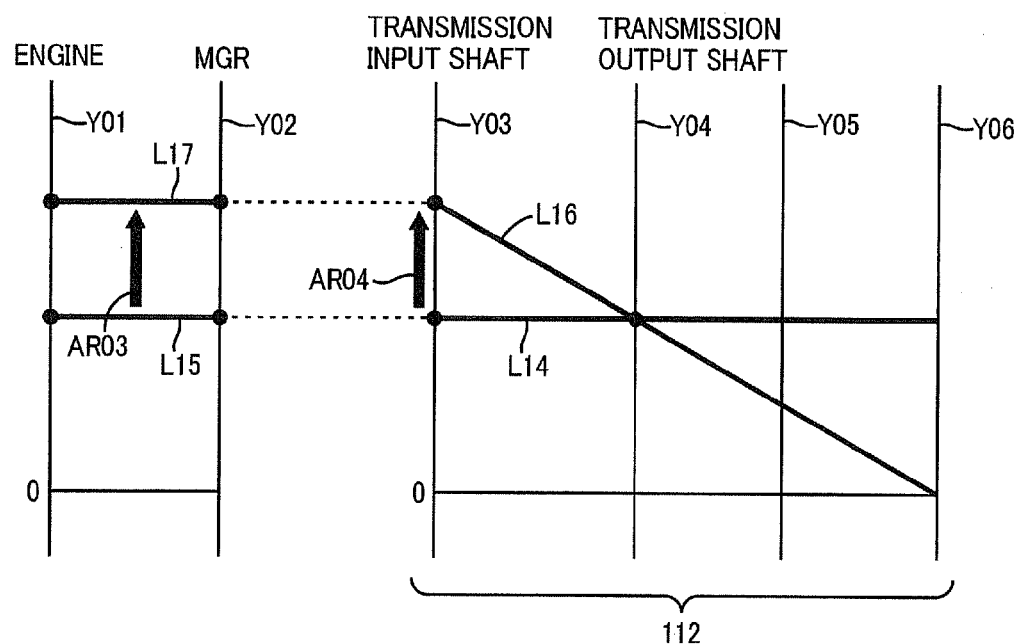
FIG. 13 a collinear chart for explaining a shift-down action of an automatic transmission provided in the vehicular drive system of FIG. 12 according to the second embodiment.

FIG. 13 a collinear chart for explaining a shift-down action of the automatic transmission 112. Vertical lines Y01, Y02, Y03 and Y04 in FIG. 13 respectively represent relative rotating speeds of the engine 14, vehicle driving electric motor MGR, transmission input shaft 116 and transmission output shaft 120. Vertical lines Y05 and Y06 respectively represent relative rotating speeds of rotary elements of the automatic transmission 112 other than the transmission input and output shafts 116, 120. The rotating speeds taken along the respective vertical lines Y01-Y06 increase in the upward direction in FIG. 13. Solid lines L14 and L15 represent the relative rotating speeds of the rotary elements including the engine 14, vehicle driving electric motor MGR, transmission input shaft 116 and transmission output shaft 120, before the above-indicated shift-down action, while solid lines L16 and L17 represent the relative rotating speeds of the rotary elements after the shift-down action. The rotating speed of the transmission output shaft 120 during running of the vehicle is determined by the rotating speed of the drive wheels 40, and therefore does not change unless the vehicle running speed V changes, so that the rotating speed of the transmission output shaft 120 does not change as a result of the above-indicated shift-down action, as is apparent from FIG. 13. The shift-down action in the above-indicated sequential shifting operation causes the engine speed Ne and an operating speed $N_{MGR}$ of the vehicle driving electric motor MGR (hereinafter referred to as "electric motor speed $N_{MGR}$") to rise as indicated by an arrow AR03, and also causes the rotating speed of the transmission input shaft 116 to rise as indicated by an arrow AR04. Since the engine 14, vehicle driving electric motor MGR and transmission input shaft 116 are connected in series to each other as shown in FIG. 12, the engine speed Ne, the electric motor speed $N_{MGR}$ and the rotating speed of the transmission input shaft 116 are equal to each other.

A shift-up action of the automatic transmission 112 causes the operating and rotating speeds of the engine 14, vehicle driving electric motor MGR and transmission input shaft 116 to change in the direction opposite to that indicated by the arrows AR03 and AR04, that is, in the direction opposite to the direction of change in the shift-down action. Namely, the shift-up action causes drops of the engine speed Ne and the electric motor speed $N_{MGR}$.

Referring back to FIG. 12, like the electronic control device 80 in the first embodiment, the electronic control device 140 in the present embodiment is provided with the shifting mode determining means 84, the shifting requirement determining means 86, the engine speed change amount calculating means 88, the required torque calculating means 90 and the torque assignment percentage determining means 92. However, the electronic control device 140 is provided with engine speed control means 142 in place of the engine speed control means 94 provided in the electronic control device 80. Like the engine speecd control means 94 in the first embodiment, the engine speed control means 142 is provided with the shifting delay detecting means 96. The control functions of the various means shown in FIG. 12 are basically the same as those in the first embodiment, except in that the control functions in FIG. 12 apply to the automatic transmission 112 rather than the first planetary gear set 20, and to the vehicle driving electric motor MGR rather than the first electric motor MG1. Aspects of the control function different from those in the first embodiment will be described.

The shifting operation of the automatic transmission 112 in the present embodiment is performed with an engaging action of one of the above-described coupling elements and a releasing action of another coupling element, as described above. Accordingly, the engine speed control means 142 functions as coupling-element control means for controlling the engaging and releasing actions of the coupling elements 118. Namely, when the shifting requirement determining means 86 has determined the vehicle operator's requirement for a shifting operation, that is, a shifting operation in the above-indicated sequential shifting mode, the engine speed control means 142 lowers a hydraulic pressure to be applied to the coupling element to be eventually brought into its released state for the shifting operation, before the moment of initiation of a change of the engine speed Ne, that is, before the moment of initiation of the above-indicated sequential shifting operation, so that the above-indicated coupling element is placed in the released state. After the releasing action of this coupling element, the engine speed control means 142 initiates the above-indicated sequential shifting operation, namely, initiates a change of the engine speed Ne during the sequential shifting operation. The engine speed control means 142 keeps the two coupling elements to be engaged and released, in the released state during the change of the engine speed Ne in the sequential shifting operation, that is, during the sequential shifting operation.

When the engine speed Ne has reached the above-indicated target post-shifting engine speed, that is, when the above-indicated sequential shifting operation is terminated, the engine speed control means 142 raises the hydraulic pressure to be applied to the coupling element to be eventually brought into its engaged state for the shifting operation, so that this coupling element is placed in the engaged state. This coupling element may be brought into its engaged state at the same time when the engine speed Ne has reached the above-indicated target post-shifting engine speed. While the engine speed control means 142 is different from the engine speed control means 94 in the aspects described above, the engine speed control means 142 is identical with the engine speed control means 94 in the other aspects.

Figure 14:
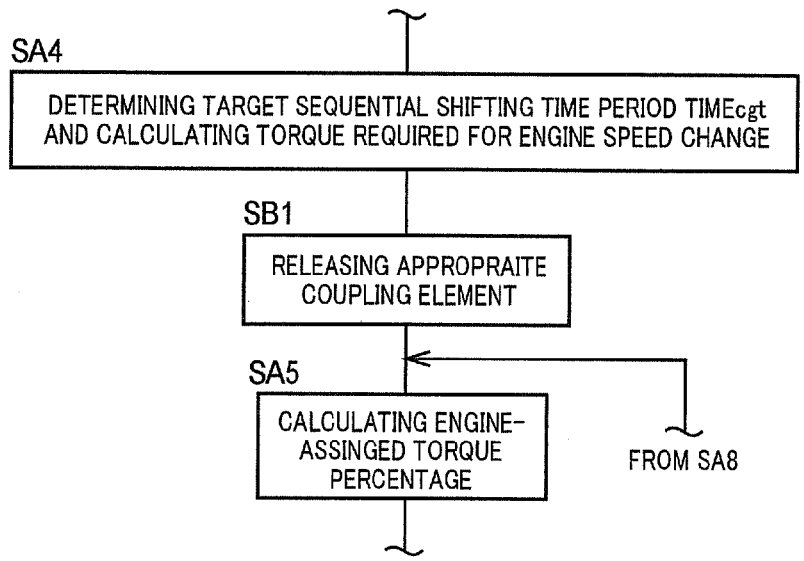
FIG. 14 is a first part of a flow chart for explaining steps of a major control operation of the electronic control device of FIG. 12, namely, a control operation to implement a sequential shifting operation, which steps are different from the corresponding steps in FIG. 8.
Figure 15:
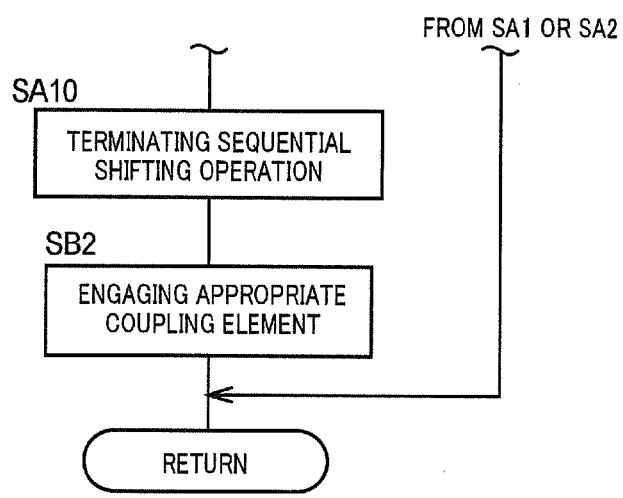
FIG. 15 is a second part of the flow chart for explaining steps of the major control operation of the electronic control device of FIG. 12, which steps are different from the corresponding steps in FIG. 8.

FIGS. 14 and 15 are parts of a flow chart for explaining steps of a major control operation of the electronic control device 140, namely, a control operation to implement the above-described sequential shifting operation, which steps are different from the corresponding steps of flowchart described in FIG. 8 in the first embodiment. The flow chart of the present embodiment is basically the same as that of FIG. 8, except for the addition of SB1 between SA4 and SA5 of FIG. 8, as indicated in FIG. 14, and the addition of SB2 to be implemented following SA10 of FIG. 8 before the return of the control flow as indicated in FIG. 15. In the present embodiment wherein the engine speed control means 142 is substituted for the engine speed control means 94 in the first embodiment, SA6, SA7, SA9 and SA10 of FIG. 8 correspond to the engine speed control means 142.

In the present embodiment, SA4 of FIG. 8 is followed by SB1 of FIG. 14. SB1 is implemented to release the coupling element to be eventually brought into its released state for the shifting operation. At this time, the coupling element to be eventually brought into its engaged state for the shifting operation is kept in the released state. For improving the engaging response of this coupling element to be eventually brought into its engaged state, however, the hydraulic pressure of the coupling element in question may be raised in SB1 to a low standby level at which its mechanical backlash or play is eliminated but the coupling element is still placed in the released state. Where the hydraulic pressure of the coupling element to be eventually brought into its engaged state is raised to the low standby level in SB1, this low standby level is maintained until SB2 of FIG. 15 is implemented. SB1 is followed by SA5 of FIG. 8.

In the present embodiment, SA10 of FIG. 8 is followed by SB2 of FIG. 15. SB2 is implemented to engage the coupling element to be eventually brought into its engaged state. SB1 and SB2 correspond to the engine speed control means 142.

Figure 16:
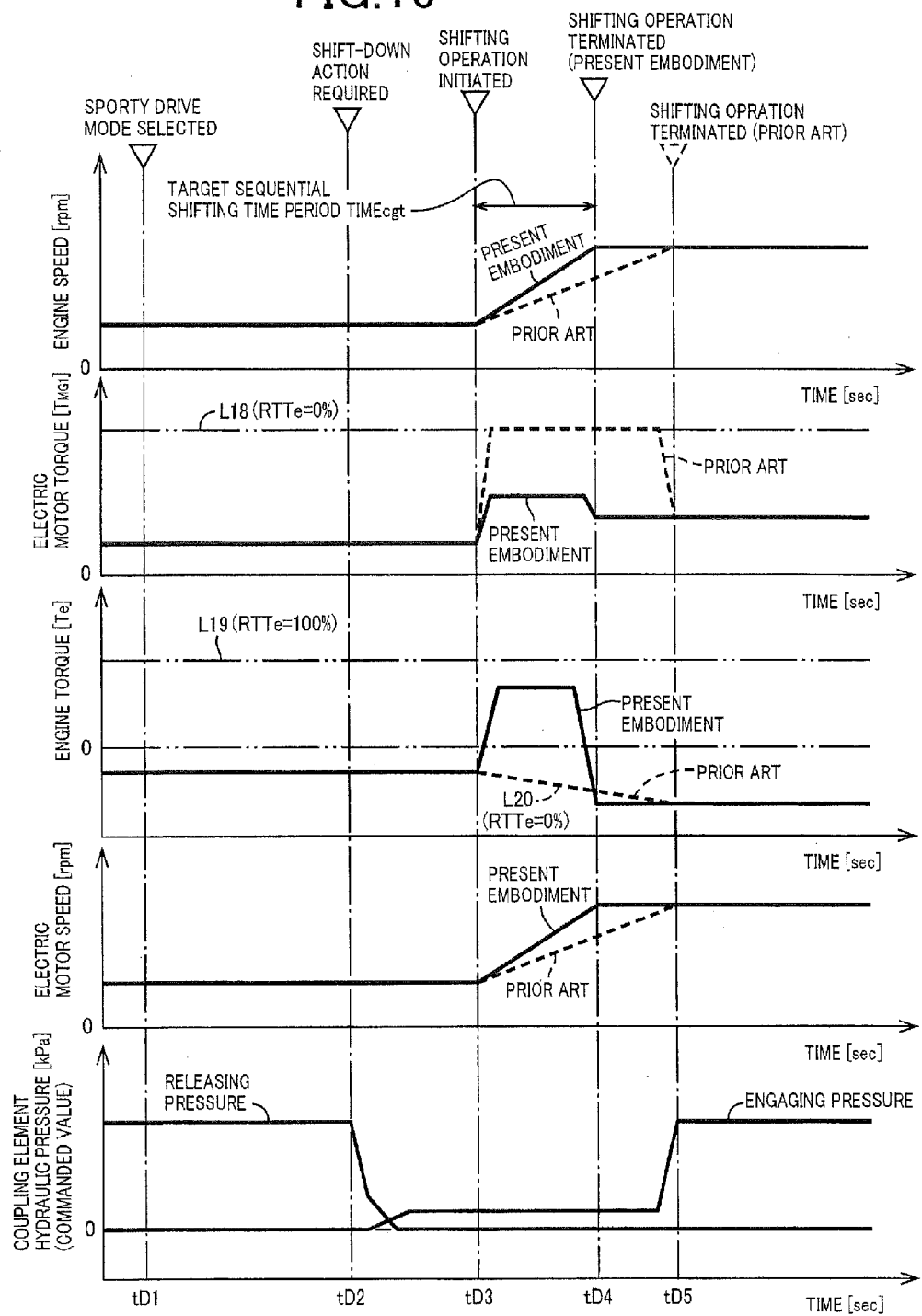
FIG. 16 is a time chart for explaining a control operation of the electronic control device of FIG. 12 according to the second embodiment, more specifically, an operation to control the torques of the engine and a vehicle driving electric motor in the process of a sequential shifting operation of an automatic transmission 112 in the form of a shift-down action (sequential shift-down action) performed during the above-described coasting run of the vehicle.

FIG. 16 is the time chart for explaining an operation to control the torques of the engine 14 and the vehicle driving electric motor MGR in the process of the above-described sequential shifting operation of the automatic transmission 112 in the form of a shift-down action (sequential shift-down action) performed during the above-described coasting run of the vehicle. In FIG. 16, solid lines show the control according to the present embodiment while broken lines show the control according to the prior art. The prior art shown in FIG. 16 is the same as that of the first embodiment of FIG. 9 wherein the engine torque Te is not used to change the engine speed Ne in the above-indicated sequential shifting operation, but the engine speed Ne is changed solely by a torque $T_{MGR}$ generated by the vehicle driving electric motor MGR (hereinafter referred to as "electric motor torque $T_{MGR}$") in the sequential shifting operation to proceed the sequential shifting operation. In FIG. 16, a two-dot chain line L18 represents the electric motor torque $T_{MGR}$ when the above-indicated engine-assigned torque percentage RTTe is 0%, and a two-dot chain line L19 represents the engine torque Te when the above-indicated engine-assigned torque percentage RTTe is 100%, while a broken line L20 represents the engine torque Te when the above-indicated engine-assigned torque percentage RTTe is 0%. In the example of FIG. 16, the accelerator pedal operation amount Acc is held at zero. The vehicle running speed V is held constant in the example of the time chart of FIG. 16. Before a point of time tD3 and after a point of time tD4 indicated in the time chart, the engine torque Te (indicated by a solid line) is negative, so that the engine 14 functions as a load, providing a so-called "engine braking" effect. At a point of time tD1, the vehicle 106 is placed in the above-indicated sequential shifting mode (sporty drive mode), so that the affirmative determination is obtained in SA1 of FIG. 8 at the point of time tD1.

At a point of time tD2 in FIG. 16, the above-indicated requirement for the shifting operation, more specifically, the requirement for a shift-down action of the automatic transmission 112 is made by an operation of the shift lever 46 to the "−" position (shown in FIG. 2), for example, so that the affirmative determination is obtained in SA2 of FIG. 8. At the point of time tD2, the hydraulic pressure to be applied to the coupling element to be eventually brought into its released state is lowered, so that this coupling element is placed in the released state. Immediately after the point of time tD2, the hydraulic pressure to be applied to the coupling element to be eventually brought into its engaged state is slightly raised to the above-indicated low standby level. According to the present embodiment, the above-indicated sequential shifting operation, more specifically, the sequential shift-down action is initiated at the point of time tD3, and terminated at the point of time tD4. According to the prior art, on the other hand, the above-indicated sequential shifting operation is also initiated at the point of time tD3, but is terminated at a point of time tD5 after the point of time tD4. The engine speed Ne is raised to the above-indicated target post-shifting engine speed while the electric motor speed $N_{MGR}$ is raised during the above-indicated sequential shifting operation, namely, during a time period from the point of time tD3 to the point of time tD4 in the present embodiment, and during a time period from the point of time tD3 to the point of time tD5 in the prior art. According to the present embodiment, the sequential shifting operation is not delayed, that is, the sequential shifting time period TIMEcg from the point of time tD3 to the point of time tD4 is coincident with the target sequential shifting time period TIMEcgt, as is apparent from a change of the engine speed Ne indicated in the time chart. At the point of time tD5, the hydraulic pressure to be applied to the coupling element to be eventually brought into its engaged state and then, the coupling element is placed in the fully engaged state. However, the point of time at which this coupling element is placed in the fully engaged state is not particularly limited as long as it is placed in the fully engaged state at a point of time not prior to the point of time tD4 at which the engine speed Ne has reached the above-indicated target post-shifting engine speed.

According to the above-described prior art, the engine torque Te is not changed to raise the engine speed Ne during the sequential shifting operation (between points of time tD3 and tD5), as indicated by the broken line in FIG. 16, but only the electric motor torque $T_{MGR}$ is increased with respect to the value prior to the moment of initiation of the sequential shifting operation, to raise the engine speed Ne during the sequential shifting operation. According to the present embodiment, on the other hand, the engine speed Ne is raised by increasing both the engine torque Te and the electric motor torque $T_{MGR}$ with respect to the values prior to the moment of initiation of the sequential shifting operation, during the sequential shifting operation (from the point of time tD3 to the point of time tD4) as shown in FIG. 16. At this time, the engine-assigned torque percentage RTTe is determined to be 80%, for instance, while the electric-motor-assigned torque percentage RTTmg is determined to be 20%, for instance. Thus, the present embodiment is configured to permit the sequential shifting time period TIMEcg to be made shorter than in the prior art, as in the first embodiment, although the automatic transmission 112 is substituted for the first planetary gear set 20 provided in the first embodiment.

It will be understood from the foregoing description that the present embodiment provides the same advantages as the first embodiment described above.

While the embodiments of the present invention have been described in detail by reference to the drawings, for illustrative purpose only, it is to be understood that the invention may be embodied with various changes and improvements, which may occur to those skilled in the art.

For example, the illustrated first and second embodiments wherein the above-described sequential shifting operation which causes a discrete change of the engine speed Ne is performed in response to an operation of the shift lever 46 by the vehicle operator may be modified such that the sequential shifting operation is performed in response to an operation of a paddle switch disposed near a steering wheel or other steering device, or any other manual shifting operation.

In the illustrated first and second embodiments, the determination as to whether the above-indicated sequential shifting mode is selected is made in SA1 of FIG. 8 by determining whether the selected shift position $P_{SH}$ is the manual forward-drive position "M". However, the affirmative determination may be obtained in SA1 of FIG. 8 when any one of the following shifting modes, for example, is selected by the vehicle operator desiring a high degree of response of the vehicle 6, 106: a power drive mode to be selected by the vehicle operator desiring a high degree of the vehicle drivability rather than a high degree of the vehicle fuel economy; a paddle or manual shifting mode to be selected with the operation of the above-described paddle switch to change the speed ratio in steps; and a drive mode to be selected with the operation of the above-described paddle switch with the shift lever placed in the position "D".

In the illustrated first and second embodiments, the permissible battery discharging energy amount limit Wout is taken along the horizontal axis of FIG. 6. However, the permissible battery discharging energy amount limit Wout may be replaced by the stored electric energy amount SOC or the temperature of the electric-energy storage device 68, since the permissible battery discharging energy amount limit Wout decreases with a decrease of the stored energy amount SOC of the electric-energy storage device 68, or with a drop of the temperature of the electric-energy storage device 68.

In the illustrated first and second embodiments, the engine water temperature $TEMP_W$ is taken along the horizontal axis of FIG. 7. However, the engine water temperature $TEMP_W$ may be replaced by any other parameter indicative of the rotary resistance of the engine 14, such as the temperature of an engine oil lubricating the engine 14, or a time elapse from the moment of initiation of a warm-up operation of the engine 14.

In the illustrated first and second embodiments, the engine-assigned torque percentage RTTe is calculated according to the relationships of FIGS. 5-7. However, the engine-assigned torque percentage RTTe may be calculated according to the relationship of FIG. 5, without using the relationships of FIGS. 6 and 7.

Although the relationships of FIGS. 5-7 used in the illustrated first and second embodiments are formulated such that the engine-assigned torque percentage RTTe continuously changes with the shifting-time engine speed change amount Ned, the permissible battery discharging energy amount limit Wout and the engine water temperature $TEMP_W$, the relationships may be modified so as to change the engine-assigned torque percentage RTTe in two, three or more steps.

While the above-described sequential shifting operation in the illustrated first embodiment is a step-variable shifting operation performed within a range of a total of four speed positions, the step-variable shifting operation may be performed within a range of two, three, five or more speed positions.

Although the automatic transmission 112 in the illustrated second embodiment is a step-variable transmission having four speed positions, the automatic transmission 112 may be replaced by a step-variable transmission having two, three, five or more speed positions.

While the engine 14 and the vehicle driving electric motor MGR are connected in series to each other in the illustrated second embodiment of FIG. 12, a power disconnecting device such as a clutch may be disposed between the engine 14 and the vehicle driving electric motor MGR, to place a power transmitting path therebetween in a power cut-off state.

Figure 17:
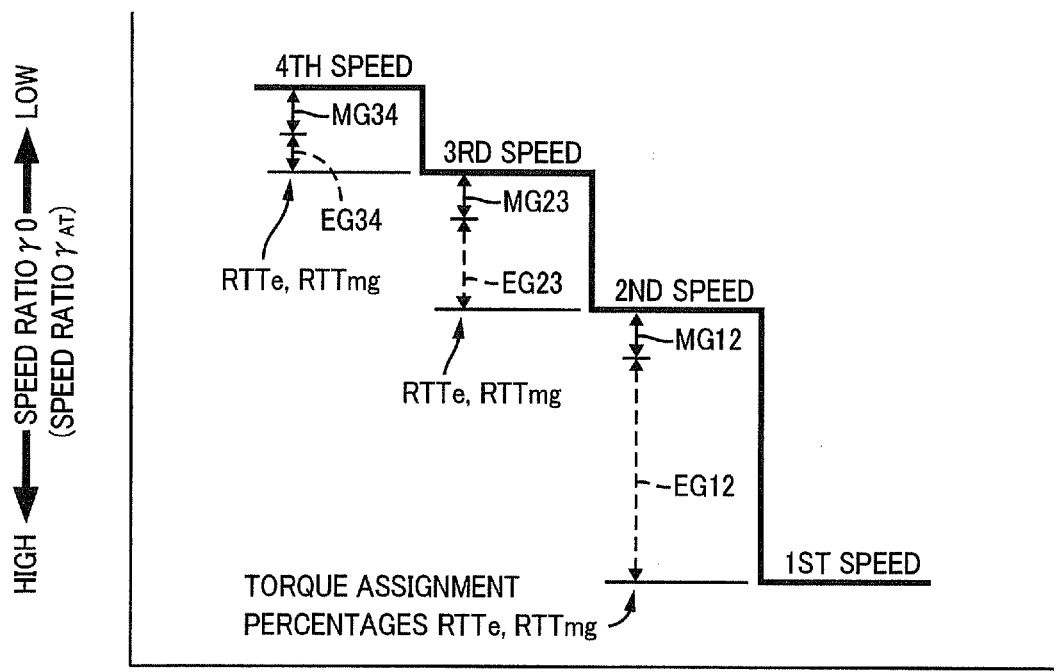
FIG. 17 is a view illustrating an example of determination of the engine-assigned torque percentage by the electronic control devices of FIGS. 4 and 12 depending upon the speed positions established before and after the sequential shifting operation.

In the illustrated first and second embodiments, the engine-assigned torque percentage RTTe is determined continuously in advance according to a parameter in the form of the shifting-time engine speed change amount Ned, as indicated in FIG. 5. However, it may be determined in advance according to the speed positions established before and after the above-indicated sequential shifting operation as the parameter. Namely, the engine-assigned torque percentage RTTe may be determined according to a predetermined relationship and on the basis of the speed positions established before and after the sequential shifting operation. FIG. 17 is the view illustrating an example of determination of the engine-assigned torque percentage RTTe depending upon the speed positions established before and after the sequential shifting operation as the parameters. In FIG. 17, EG12 and MG12 respectively represent the engine-assigned torque percentage RTTe and the electric-motor-assigned torque percentage RTTmg in the case of the shifting operation (shift-up or shift-down action) of the first planetary gear set 20 (automatic transmission 112) between the first and second speed positions, and EG23 and MG23 respectively represent the engine-assigned torque percentage RTTe and the electric-motor-assigned torque percentage RTTmg in the case of the shifting operation between the second and third speed positions, while EG34 and MG34 respectively represent the engine-assigned torque percentage RTTe and the electric-motor-assigned torque percentage RTTmg in the case of the shifting operation between the third and fourth speed positions. It will be understood from FIG. 17 that an amount of change of the speed ratio $\gamma 0$, $\gamma_{AT}$ of the first planetary gear set 20 or automatic transmission 112 caused by the above-indicated sequential shifting operation, namely, a difference of the values of the speed ratio $\gamma 0$, $\gamma_{AT}$ before and after the sequential shifting operation is relatively large where the sequential shifting operation takes place between the relatively low speed positions. It will also be understood from FIG. 17 that the engine-assigned torque percentage RTTe increases in steps as the speed positions before and after the sequential shifting operation change toward the side of the lower speed positions. Described more specifically, EG12 is larger than EG23, and EG23 is larger than EG34, as indicated in FIG. 17. Further, MG12 is smaller than MG23, and MG23 is smaller than MG34, as also indicated in FIG. 17. In the case of the above-indicated sequential shift-down action (discrete shift-down action), for example, an amount of increase of the speed ratio $\gamma 0$, $\gamma_{AT}$ caused by the sequential shift-down action and the engine-assigned torque percentage RTTe increase with an increase of the speed ratio $\gamma 0$, $\gamma_{AT}$ before the sequential shift-down action. The relationship of FIG. 17 makes it possible to minimize an increase of the above-indicated sequential shifting time period TIMEcg due to an increase of the shifting-time engine speed change amount Ned, assuring a high degree of response of the vehicle 6 to the operation of the vehicle operator, and an improvement of the drivability of the vehicle 6 during the sequential shifting operation. In addition, the relationship of FIG. 17 makes it possible to minimize a variation of the above-indicated sequential shifting time period TIMEcg of each sequential shifting operation, irrespective of the low speed positions or high speed positions before and after the sequential shifting operation, thereby improving the vehicle drivability in the sequential shifting operation. Further, the relationship makes it possible to reduce a control load upon determination of the engine-assigned torque percentage RTTe prior to the initiation of the above-indicated sequential shifting operation.

While the illustrated second embodiment of FIG. 12 is not provided with an electric motor disposed between the transmission output shaft 120 and the differential gear device 114, the second embodiment may be modified such that a friction clutch is disposed between the transmission output shaft 120 and the differential gear device 114, and such that an electric motor (motor/generator) is disposed between the friction clutch and the differential gear device 114, as another vehicle drive power source in addition to the vehicle driving electric motor MGR.

Although the automatic transmission 112 provided in the illustrated second embodiment is a step-variable transmission, the automatic transmission 112 may be replaced by a continuously-variable transmission such as a belt-type CVT. In this case, the speed ratio $\gamma_{AT}$ of the continuously-variable transmission is changed in steps in the above-described sequential shifting operation.

In the first planetary gear set 20 in the illustrated first embodiment, the first carrier CA1 is connected to the engine 14, and the first sun gear S1 is connected to the first electric motor MG1, while the first ring gear R1 is connected to the output gear 24. However, this relationship of connection is not essential, and the engine 14, first electric motor MG1 and output gear 24 may be respectively connected to any ones of the three rotary elements CA1, S1 and R1 of the first planetary gear set 20.

While the ring gear R2 of the second planetary gear set 22 in the illustrated first embodiment is integrally connected to the ring gear R1 of the first planetary gear set 20, the ring gear R2 need not be integrally connected to the ring gear R1, and may be integrally connected to the first carrier CA1 of the first planetary gear set 20, for instance. Further, the above-indicated ring gear R2 may be connected to any member provided in the power transmitting path between the first planetary gear set 20 and the drive wheels 40, rather than the above-indicated ring gear R1.

In the illustrated first embodiment, the vehicular power transmitting device 10 is provided with the second planetary gear set 22 constituting a part of the power transmitting path between the second electric motor MG2 and the drive wheels 40. However, the second planetary gear set 22 may be eliminated so that the second electric motor MG2 is connected directly to the output gear 24.

Although the second planetary gear set 22 in the illustrated first embodiment has the fixed speed ratio, the second planetary gear set 22 may be replaced by a transmission such as an automatic transmission, the speed ratio of which is variable.

In the illustrated first embodiment, the power transmitting path between the output gear 24 and the drive wheels 40 is not provided with a transmission. However, this power transmitting path may be provided with a mechanically operated transmission such as a manual or automatic transmission the speed ratio of which is mechanically variable.

While the input shaft 18 is connected to the engine 14 through the damper 16 in the illustrated first embodiment, the damper 16 may be eliminated so that the input shaft 18 is connected directly to the engine 14, or indirectly to the engine 14 through a belt or gears.

The power transmitting device 10 in the illustrated first embodiment is not provided with a power disconnecting device such as a clutch disposed between the engine 14 and the first planetary gear set 20. However, this power disconnecting device may be disposed between the engine 14 and the first planetary gear set 20. Such a power disconnecting device may be provided for the first electric motor MG1 and the second electric motor MG2, for instance, disposed between the first electric motor MG1 and the first planetary gear set 20, or between the second electric motor MG2 and the second planetary gear set 22.

While each of the first planetary gear set 20 and the second planetary gear set 22 in the illustrated first embodiment is a single-pinion type planetary gear device, one or both of the first and second planetary gear sets 20, 22 may be a double-pinion type planetary gear device.

In the first planetary gear set 20 in the illustrated first embodiment, the first carrier CA1 composing the first planetary gear set 20 is operatively connected to the engine 14, and the first sun gear S1 is operatively connected to the first electric motor MG1, while the first ring gear R1 is connected to the power transmitting path connected to the drive wheels 40. However, the first planetary gear set 20 may be replaced by two planetary gear sets which have rotary elements connected to each other and rotary elements connected to the engine, electric motor and drive wheels in a power transmittable manner and which are switchable between a step-variable shifting state and a continuously-variable shifting state by controlling clutches or brakes connected to the rotary elements.

In the illustrated first embodiment, the second electric motor MG2 is connected through the second planetary gear set 22 to the output gear 24 which constitutes a part of the power transmitting path from the engine 14 to the drive wheels 40. However, the second electric motor MG2 connected to the output gear 24 may be selectively connected also to the first planetary gear set 20 through a coupling element such as a clutch, so that the power transmitting device 10 is capable of controlling the differential state of the first planetary gear set 20, by an operation of the second electric motor MG2 rather than the first electric motor MG1.

It is to be understood that the illustrated embodiments may be combined together, with suitable priority being given to specific aspects of the embodiments.

NOMENCLATURE OF REFERENCE SIGNS 6, 106: Vehicle
8, 108: Vehicular drive system
14: Engine
20: First planetary gear set (Transmission mechanism)
40: Drive wheels
68: Electric-energy storage device
80, 140: Electronic control device (Control apparatus)
112: Automatic transmission (Transmission mechanism)
MG1: First electric motor (Electric motor)
MGR: Vehicle driving electric motor (Electric motor)

The invention claimed is:

1. A control apparatus for a drive system of a vehicle comprising:
a transmission mechanism constituting a part of a power transmitting path between an engine and drive wheels;
an electric motor operable to change an operating speed of the engine that is in a process of shifting gears in the transmission mechanism; and
an electronic control device configured to:
control a discrete change of the operating speed of the engine with torques assigned to be respectively generated by the engine and the electric motor in a discrete shifting operation of the transmission mechanism which is performed in response to an operation by an operator of the vehicle and in which the discrete change of the operating speed of the engine takes place,
calculate a shifting torque required to change the operating speed of the engine within a predetermined target shifting time period from initiation of the discrete shifting operation to termination of the discrete shifting operation,
determine a percentage of a torque assigned to the engine that corresponds to the shifting torque and a percentage of a torque assigned to the electric motor that corresponds to the shifting torque, the percentage of the torque assigned to the engine and the electric motor being respectively based on an amount of change of the operating speed of the engine in the discrete shifting operation and according to a predetermined relationship in which the percentage of the torque assigned to the engine in the discrete shifting operation is determined such that the percentage of the torque assigned to the engine increases with an increase of the amount of change of the operating speed of the engine,
determine the respective torques of the engine and the electric motor based on the percentage of the torque assigned to the engine and the percentage of the torque assigned to the electric motor, and
change the operating speed of the engine having determined torques of the engine and the electric motor, from a value before the discrete shifting operation to a target value for after the discrete shifting operation.

2. The control apparatus according to claim 1, wherein,
the vehicle further comprises an electric-energy storage device configured to supply and receive an electric energy to and from the electric motor, and the electronic control device is further configured to determine the percentage of the torque assigned to said engine in said discrete shifting operation such that the percentage increases with an increase of an amount of limitation of charging or discharging of the electric energy of said electric-energy storage device.

3. The control apparatus according to claim 1, wherein the electronic control device is further configured to determine the percentage of the torque assigned to the engine in the discrete shifting operation such that the percentage increases with a decrease of a temperature of said engine.

4. The control apparatus according to claim 1, wherein,
the electronic control device is further configured to determine whether the discrete shifting operation will not be terminated within the predetermined target shifting time period due to insufficiency of the torque of the engine or the electric motor during a change of the operating speed of the engine in the discrete shifting operation, and
the electronic control device is further configured to reduce the percentage of one of the torques of the engine and the electric motor with respect to a value before a moment of the determination during changing the operating speed of the engine, and an amount of insufficiency of the one is larger than that of another of the torques of the engine and the electric motor.

5. A control apparatus for a drive system of a vehicle comprising:
a transmission mechanism constituting a part of a power transmitting path between an engine and drive wheels;
an electric motor operable to change an operating speed of the engine that is in a process of shifting gears in the transmission mechanism; and
an electronic control device configured to:
control a discrete rise of the operating speed of the engine with torques assigned to be respectively generated by the engine and the electric motor in a discrete shift-down operation of the transmission mechanism which is performed in response to an operation by an operator of the vehicle and in which the discrete rise of the operating speed of the engine takes place,
calculate a shifting torque required to raise the operating speed of the engine within a predetermined target shift-down time period required from initiation of the discrete shift-down operation to termination of the discrete shift-down operation,
determine a percentage of a torque assigned to the engine corresponding to the shifting torque and a percentage of a torque assigned to the electric motor corresponding to the shifting torque based on an amount of increase of a speed ratio of the transmission mechanism before and after the discrete shift-down operation and according to a predetermined relationship in which the amount of increase of the speed ratio of the transmission mechanism caused by the discrete shift-down operation and the percentage of the torque assigned to the engine in the discrete shift-down operation are made larger for larger value of the speed ratio with an increase of the speed ratio prior to the shift-down operation, and
determine the torques of the engine and the electric motor based on the percentage of the torque assigned to the engine and the percentage of the torque assigned to the electric motor, and to raise the operating speed of the engine with determined torques of the engine and the electric motor, from a value before the discrete shifting operation to a target value to be established after the discrete shift-down operation.

\* \* \* \* \*